(12) United States Patent
Matsumura et al.

(10) Patent No.: US 12,531,705 B2
(45) Date of Patent: Jan. 20, 2026

(54) TERMINAL, RADIO COMMUNICATION METHOD, AND BASE STATION

(71) Applicant: NTT DOCOMO, INC., Tokyo (JP)

(72) Inventors: Yuki Matsumura, Tokyo (JP); Satoshi Nagata, Tokyo (JP)

(73) Assignee: NTT DOCOMO, INC., Tokyo (JP)

(*) Notice: Subject to any disclaimer, the term of this patent is extended or adjusted under 35 U.S.C. 154(b) by 362 days.

(21) Appl. No.: 17/760,262

(22) PCT Filed: Feb. 13, 2020

(86) PCT No.: PCT/JP2020/005646
§ 371 (c)(1),
(2) Date: Aug. 5, 2022

(87) PCT Pub. No.: WO2021/161472
PCT Pub. Date: Aug. 19, 2021

(65) Prior Publication Data
US 2023/0074423 A1  Mar. 9, 2023

(51) Int. Cl.
*H04L 5/00* (2006.01)
*H04W 72/044* (2023.01)
*H04W 72/23* (2023.01)
*H04W 76/20* (2018.01)

(52) U.S. Cl.
CPC ............ *H04L 5/006* (2013.01); *H04L 5/0035* (2013.01); *H04L 5/0055* (2013.01); *H04W 72/046* (2013.01); *H04W 72/23* (2023.01); *H04W 76/20* (2018.02)

(58) Field of Classification Search
None
See application file for complete search history.

(56) References Cited

U.S. PATENT DOCUMENTS

| | | | | |
|---|---|---|---|---|
| 2020/0077428 | A1* | 3/2020 | Zhou | H04W 72/23 |
| 2021/0168813 | A1* | 6/2021 | Raghavan | H04W 72/53 |
| 2021/0250949 | A1* | 8/2021 | Tang | H04L 5/0048 |
| 2022/0353938 | A1* | 11/2022 | Siomina | H04L 1/1812 |

OTHER PUBLICATIONS

3GPP TSG-RAN WG2 Meeting #108; R2-1915248 "Reduction of signaling and latency for beam managements" Samsung; Reno, US; Nov. 18-22, 2019 (8 pages).

(Continued)

*Primary Examiner* — Jutai Kao
(74) *Attorney, Agent, or Firm* — Osha Bergman Watanabe & Burton LLP

(57) ABSTRACT

A terminal according to an aspect of the present disclosure includes a receiving section that receives information related to update of a transmission configuration indication (TCI) state, and a control section that determines, when update of the TCI state of a plurality of cells is performed based on the information, update timing of the TCI state in the plurality of cells, based on at least one of recognition or no recognition of the TCI state after update in the plurality of cells and an offset configured after transmission of a positive acknowledgment (ACK) for the information.

7 Claims, 9 Drawing Sheets

(56) References Cited

OTHER PUBLICATIONS

3GPP TS 38.133 V16.2.0 "3rd Generation Partnership Project; Technical Specification Group Radio Access Network; NR; Requirements for support of radio resource management (Release 16)" Dec. 2019 (4 pages).
3GPP TS 36.300 V8.12.0 "3rd Generation Partnership Project; Technical Specification Group Radio Access Network; Evolved Universal Terrestrial Radio Access (E-UTRA) and Evolved Universal Terrestrial Radio Access Network (EUTRAN); Overall description; Stage 2 (Release 8)" Mar. 2010 (149 pages).
International Search Report issued in International Application No. PCT/JP2020/005646, mailed Sep. 24, 2020 (3 pages).
Written Opinion issued in International Application No. PCT/JP2020/005646; Dated Sep. 24, 2020 (3 pages).
Extended European Search Report issued in European Application No. 20918965.3, mailed Oct. 19, 2023 (9 pages).
Intel Corporation: "On TCI State Switch Delay", 3GPP TSG-RAN WG4 Meeting #90, R4-1900111, Athens, GR, Feb. 25-Mar. 1, 2019 (5 pages).
NEC: "Delay requirements for active TCI state switch", 3GPP TSG-RAN WG4 Meeting #90, R4-1900748; Athens, Greece, Feb. 25-Mar. 1, 2019 (4 pages).
Huawei, HiSilicon: "Discussion on TCI state switching requirements", 3GPP TSG-RAN WG4 Meeting #90, R4-1901216; Athens, Greece, Feb. 25-Mar. 1, 2019 (2 pages).
Office Action issued in counterpart Chinese Patent Application No. 202080096487.1 mailed on May 31, 2024 (14 pages.
3GPP TS 38.133 V16.1.0 "3rd Generation Partnership Project; Technical Specification Group Radio Access Network; NR; Requirements for support of radio resource management (Release 16)" Sep. 2019; pp. 16-208 (193 pages).
Office Action issued in Korean Application No. 10-2022-7026295; Dated Apr. 3, 2025 (9 pages).

* cited by examiner

TERMINAL, RADIO COMMUNICATION METHOD, AND BASE STATION

TECHNICAL FIELD

The present disclosure relates to a terminal, a radio communication method, and a base station in next-generation mobile communication systems.

BACKGROUND ART

In a Universal Mobile Telecommunications System (UMTS) network, the specifications of Long-Term Evolution (LTE) have been drafted for the purpose of further increasing high speed data rates, providing lower latency and so on (see Non-Patent Literature 1). In addition, for the purpose of further high capacity, advancement and the like of the LTE (Third Generation Partnership Project (3GPP) Release (Rel.) 8 and Rel. 9), the specifications of LTE-Advanced (3GPP Rel. 10 to Rel. 14) have been drafted.

Successor systems of LTE (e.g., referred to as "5th generation mobile communication system (5G)," "5G+ (plus)," "New Radio (NR)," "3GPP Rel. 15 (or later versions)," and so on) are also under study.

CITATION LIST

Non-Patent Literature

Non-Patent Literature 1: 3GPP TS 36.300 V8.12.0 "Evolved Universal Terrestrial Radio Access (E-UTRA) and Evolved Universal Terrestrial Radio Access Network (E-UTRAN); Overall description; Stage 2 (Release 8)," April, 2010

SUMMARY OF INVENTION

Technical Problem

For future radio communication systems (for example, NR), control of reception processing and transmission processing in a UE, based on a transmission configuration indication state (TCI state) is under study. In existing systems (for example, Rel. 15), when update of the TCI state (for example, update of the TCI state in an active state) in each cell is performed, update of the TCI state is controlled by performing notification of information for indicating update of the TCI state for each cell.

In contrast, in Rel. 16 or later versions, when update of the TCI state is indicated for a certain cell (or CC), support of a configuration in which update of the TCI states of other cells is also performed is under study.

However, when update of the TCI states of a plurality of cells is performed based on common indication information, how to control update (for example, update timing) of the TCI state in each cell has not yet been fully studied. Unless update of the TCI state in each cell is appropriately performed, communication quality may be deteriorated.

In view of this, the present disclosure has an object to provide a terminal, a radio communication method, and a base station that enable appropriate control of update of a TCI state(s) in one or more cells.

Solution to Problem

A terminal according to an aspect of the present disclosure includes a receiving section that receives information related to update of a transmission configuration indication (TCI) state, and a control section that determines, when update of the TCI state of a plurality of cells is performed based on the information, update timing of the TCI state in the plurality of cells, based on at least one of recognition or no recognition of the TCI state after update in the plurality of cells and an offset configured after transmission of a positive acknowledgment (ACK) for the information.

Advantageous Effects of Invention

According to an aspect of the present disclosure, update of a TCI state(s) in one or more cells can be appropriately controlled.

Figure 1:
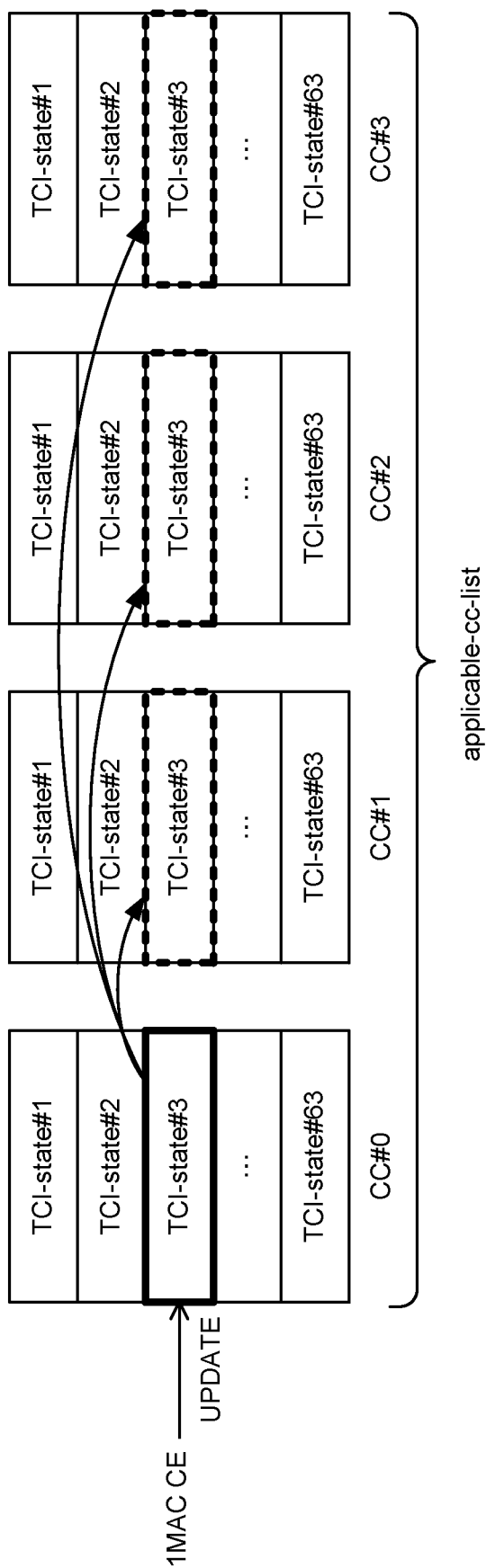
FIG. 1 is a diagram to show an example of a case in which update of TCI states of a plurality of CCs is performed using one MAC CE.

DESCRIPTION OF EMBODIMENTS (TCI, Spatial Relation, QCL)

For NR, control of reception processing (for example, at least one of reception, demapping, demodulation, and decoding) and transmission processing (for example, at least one of transmission, mapping, precoding, modulation, and coding) in a UE regarding at least one of a signal and a channel (which are referred to as a signal/channel), based on a transmission configuration indication state (TCI state) is under study.

The TCI state may be a state applied to a downlink signal/channel. A state that corresponds to the TCI state applied to an uplink signal/channel may be expressed as spatial relation.

The TCI state is information related to quasi-co-location (QCL) of the signal/channel, and may be referred to as a spatial reception parameter, spatial relation information, or the like. The TCI state may be configured for the UE for each channel or for each signal.

QCL is an indicator indicating statistical properties of the signal/channel. For example, when a certain signal/channel and another signal/channel are in a relationship of QCL, it may be indicated that it is assumable that at least one of Doppler shift, a Doppler spread, an average delay, a delay spread, and a spatial parameter (for example, a spatial reception parameter (spatial Rx parameter)) is the same (the relationship of QCL is satisfied in at least one of these) between such a plurality of different signals/channels.

Note that the spatial reception parameter may correspond to a receive beam of the UE (for example, a receive analog beam), and the beam may be identified based on spatial QCL. The QCL (or at least one element in the relationship of QCL) in the present disclosure may be interpreted as sQCL (spatial QCL).

For the QCL, a plurality of types (QCL types) may be defined. For example, four QCL types A to D may be provided, which have different parameter(s) (or parameter set(s)) that can be assumed to be the same, and such parameter(s) (which may be referred to as QCL parameter (s)) are described below:

QCL type A (QCL-A): Doppler shift, Doppler spread, average delay, and delay spread,
QCL type B (QCL-B): Doppler shift and Doppler spread,
QCL type C (QCL-C): Doppler shift and average delay, and
QCL type D (QCL-D): Spatial reception parameter.

A case that the UE assumes that a certain control resource set (CORESET), channel, or reference signal is in a relationship of specific QCL (for example, QCL type D) with another CORESET, channel, or reference signal may be referred to as QCL assumption.

The UE may determine at least one of a transmit beam (Tx beam) and a receive beam (Rx beam) of the signal/channel, based on the TCI state or the QCL assumption of the signal/channel.

The TCI state may be, for example, information related to QCL between a channel as a target (in other words, a reference signal (RS) for the channel) and another signal (for example, another RS). The TCI state may be configured (indicated) by higher layer signaling or physical layer signaling, or a combination of these.

In the present disclosure, the higher layer signaling may be, for example, any one of Radio Resource Control (RRC) signaling, Medium Access Control (MAC) signaling, broadcast information, and the like, or a combination of these.

The MAC signaling may use, for example, a MAC control element (MAC CE), a MAC Protocol Data Unit (PDU), or the like. The broadcast information may be, for example, a master information block (MIB), a system information block (SIB), minimum system information (Remaining Minimum System Information (RMSI)), other system information (OSI), or the like.

The physical layer signaling may be, for example, downlink control information (DCI).

A channel for which the TCI state or spatial relation is configured (indicated) may be, for example, at least one of a downlink shared channel (Physical Downlink Shared Channel (PDSCH)), a downlink control channel (Physical Downlink Control Channel (PDCCH)), an uplink shared channel (Physical Uplink Shared Channel (PUSCH)), and an uplink control channel (Physical Uplink Control Channel (PUCCH)).

The RS to have a QCL relationship with the channel may be, for example, at least one of a synchronization signal block (SSB), a channel state information reference signal (CSI-RS), a reference signal for measurement (Sounding Reference Signal (SRS)), a CSI-RS for tracking (also referred to as a Tracking Reference Signal (TRS)), and a reference signal for QCL detection (also referred to as a QRS).

The SSB is a signal block including at least one of a primary synchronization signal (PSS), a secondary synchronization signal (SSS), and a broadcast channel (Physical Broadcast Channel (PBCH)). The SSB may be referred to as an SS/PBCH block.

The UE may receive configuration information (for example, PDSCH-Config or tci-StatesToAddModList) including a list of information elements of the TCI state by using higher layer signaling.

An information element ("TCI-state IE" of RRC) of the TCI state configured by using higher layer signaling may include a TCI state ID and one or a plurality of pieces of QCL information ("QCL-Info"). The QCL information may include at least one of information related to the RS to have a QCL relationship (RS relation information) and information indicating a QCL type (QCL type information). The RS relation information may include information such as an index of the RS (for example, an SSB index or a non-zero-power (NZP) CSI-RS resource ID (Identifier)), an index of a cell in which the RS is located, and an index of a Bandwidth Part (BWP) in which the RS is located.

In Rel. 15 NR, as the TCI state of at least one of the PDCCH and the PDSCH, both of the RS of QCL type A and the RS of QCL type D, or only the RS of QCL type A may be configured for the UE.

In a case where the TRS is configured as the RS for the QCL type A, unlike a demodulation reference signal (DMRS) for the PDCCH or the PDSCH, the TRS is assumed to be transmitted such that the same TRS is periodically transmitted for an extended period of time. The UE can measure the TRS and calculate the average delay, the delay spread, and the like.

In a case where, for the UE, the TRS is configured as the RS for the QCL type A, in the TCI state of the DMRS for the PDCCH or the PDSCH, the UE can assume that the DMRS for the PDCCH or the PDSCH is the same as the QCL type A parameters (average delay, delay spread, and the like) for the TRS. Thus, the type A parameters (average delay, delay spread, and the like) for the DMRS for the PDCCH or the PDSCH can be determined from measurement results for the TRS. When performing channel estimation for at least one of the PDCCH and the PDSCH, the UE can use the measurement results for the TRS to perform more accurate channel estimation.

In a case where the RS for the QCL type D is configured for the UE, the UE can use the RS for the QCL type D to determine the UE receive beam (spatial domain reception filter and UE spatial domain reception filter).

The RS for QCL type X for the TCI state may mean the RS in the QCL type X relation with (the DMRS for) a certain channel/signal, and the RS may be referred to as a QCL source of the QCL type X for the TCI state.

<TCI State for PDCCH>

Information related to the QCL between the PDCCH (or a DMRS antenna port related to the PDCCH) and a certain RS may be referred to as a TCI state for the PDCCH or the like.

The UE may determine the TCI state for a UE-specific PDCCH (CORESET), based on higher layer signaling. For example, one or a plurality of (K) TCI states may be configured for the UE for each CORESET by using RRC signaling.

For the UE, for each CORESET, one of the plurality of TCI states configured by using RRC signaling may be activated by using the MAC CE. The MAC CE may be referred to as a TCI state indication MAC CE for a UE-specific PDCCH (TCI State Indication for UE-specific PDCCH MAC CE). The UE may perform monitoring of the CORESET, based on an active TCI state corresponding to the CORESET.

<TCI State for PDSCH>

Information related to the QCL between the PDSCH (or a DMRS antenna port related to the PDSCH) and a certain DL-RS may be referred to as a TCI state for the PDSCH or the like.

M (M≥1) TCI states for the PDSCH (M pieces of QCL information for the PDSCH) may be notified to (configured for) the UE by using higher layer signaling. Note that the number M of TCI states configured for the UE may be restricted by at least one of UE capability and the QCL type.

The DCI used for scheduling of the PDSCH may include a field (which may be referred to as, for example, a TCI field, a TCI state field, or the like) indicating the TCI state for the PDSCH. The DCI may be used for scheduling of the PDSCH of one cell, and may be referred to as, for example, DL DCI, DL assignment, DCI format 1_0, DCI format 1_1, or the like.

Whether or not the TCI field is included in the DCI may be controlled with information notified from the base station to the UE. The information may be information (for example, TCI presence information, TCI presence information in DCI, higher layer parameter TCI-PresentInDCI) indicating whether the TCI field is present or absent in the DCI. The information may be, for example, configured for the UE by using higher layer signaling.

When more than eight types of TCI states are configured for the UE, eight or less types of TCI states may be activated (or specified), by using the MAC CE. The MAC CE may be referred to as a TCI state activation/deactivation MAC CE for a UE-specific PDSCH (TCI States Activation/Deactivation for UE-specific PDSCH MAC CE). The value of the TCI field in the DCI may indicate one of the TCI states activated using the MAC CE.

When the TCI presence information set as "enabled" is configured for the UE for the CORESET for scheduling the PDSCH (CORESET used for PDCCH transmission for scheduling the PDSCH), the UE may assume that the TCI field is present in DCI format 1_1 of the PDCCH transmitted on the CORESET.

In a case in which the TCI presence information is not configured for the CORESET for scheduling the PDSCH, or the PDSCH is scheduled by DCI format 1_0, when a time offset between reception of the DL DCI (DCI for scheduling the PDSCH) and reception of the PDSCH corresponding to the DCI is equal to or larger than a threshold, in order to determine the QCL of a PDSCH antenna port, the UE may assume that the TCI state or the QCL assumption for the PDSCH is the same as the TCI state or the QCL assumption applied to the CORESET used for PDCCH transmission for scheduling the PDSCH.

In a case in which the TCI presence information is set as "enabled", when the TCI field in the DCI in a component carrier (CC) for scheduling (the PDSCH) indicates an activated TCI state in the scheduled CC or the DL BWP, and the PDSCH is scheduled by DCI format 1_1, in order to determine the QCL of the PDSCH antenna port, the UE may use the TCI in accordance with the value of the TCI field in the detected PDCCH having the DCI. When the time offset between reception of the DL DCI (for scheduling the PDSCH) and the PDSCH corresponding to the DCI (PDSCH scheduled by the DCI) is equal to or larger than the threshold, the UE may assume that the DM-RS port of the PDSCH of the serving cell is QCLed with the RS in the TCI state related to a QCL type parameter given by the indicated TCI state.

When a single slot PDSCH is configured for the UE, the indicated TCI state may be based on the activated TCI state in the slot having the scheduled PDSCH. When a plurality of slot PDSCHs are configured for the UE, the indicated TCI state may be based on the activated TCI state in the first slot having the scheduled PDSCH, and the UE may expect that the TCI state is the same over the slots having the scheduled PDSCH. When the CORESET associated with the search space set for cross carrier scheduling is configured for the UE, the TCI presence information is set to "enabled" for the UE for the CORESET, and when at least one of the TCI states configured for the serving cell scheduled by the search space set includes QCL type D, the UE may assume that the time offset between a detected PDCCH and the PDSCH corresponding to the PDCCH is equal to or larger than the threshold.

In both of the case in which the TCI information in DCI (higher layer parameter TCI-PresentInDCI) is set to "enabled" and the case in which the TCI information in DCI is not configured in an RRC connected mode, when the time offset between reception of the DL DCI (DCI for scheduling the PDSCH) and its corresponding PDSCH (PDSCH scheduled by the DCI) is less than the threshold, the UE may assume that the DM-RS port of the PDSCH of the serving cell has the smallest (lowest) CORESET-ID in the most recent (latest) slot in which one or more CORESETs in the active BWP of the serving cell are monitored by the UE, and is QCLed with the RS related to the QCL parameter used for QCL indication of the PDCCH of the CORESET associated with the monitored search space (FIG. 1). The RS may be referred to as a default TCI state of the PDSCH or a default QCL assumption of the PDSCH.

The time offset between the reception of the DL DCI and the reception of the PDSCH corresponding to the DCI may be referred to as a scheduling offset.

The threshold may be referred to as time duration for QCL, a "timeDurationForQCL", a "Threshold", a "Threshold for offset between a DCI indicating a TCI state and a PDSCH scheduled by the DCI", a "Threshold-Sched-Offset", a schedule offset threshold, a scheduling offset threshold, or the like.

The time duration for QCL may be based on the UE capability, and may be, for example, based on a delay that is required for decoding of the PDCCH and beam switching. The time duration for QCL may be a minimum period of time that is required for the UE to perform PDCCH reception and application of spatial QCL information received in the DCI for PDSCH processing. The time duration for QCL may be represented by the number of symbols for each subcarrier spacing, or may be represented by time (for example, has). Information of the time duration for QCL may be reported from the UE to the base station as UE capability information, or may be configured by the base station for the UE by using higher layer signaling.

For example, the UE may assume that the DMRS port of the PDSCH is QCLed with the DL-RS that is based on the TCI state activated for the CORESET corresponding to the lowest CORESET-ID. The most recent slot may be, for example, a slot in which the DCI for scheduling the PDSCH is received.

Note that the CORESET-ID may be an ID configured by using an RRC information element "ControlResourceSet" (ID for identification of the CORESET, controlResourceSetId).

When no CORESET is configured for a CC, the default TCI state may be an activated TCI state having the lowest ID that can be applied to the PDSCH in the active DL BWP of the CC.

In Rel. 16 or later versions, when the PDSCH and the PDCCH for scheduling the PDSCH are present in different component carriers (CCs) (cross carrier scheduling), when a delay from the PDCCH to the PDSCH (PDCCH-to-PDSCH delay) is shorter than a time duration for the QCL, or when the TCI state is not in the DCI for the scheduling, the UE may acquire the QCL assumption for the PDSCH scheduled from the active TCI state that can be applied to the PDSCH in the active BWP of the scheduled cell and that has the lowest ID.

<Spatial Relation for PUCCH>

For the UE, parameters (PUCCH configuration information, PUCCH-Config) used for PUCCH transmission may be configured by using higher layer signaling (for example, Radio Resource Control (RRC) signaling). The PUCCH configuration information may be configured for each partial band (for example, an uplink bandwidth part (BWP)) in a carrier (also referred to as a cell or a component carrier (CC)).

The PUCCH configuration information may include a list of pieces of PUCCH resource set information (for example, PUCCH-ResourceSet) and a list of pieces of PUCCH spatial relation information (for example, PUCCH-SpatialRelationInfo).

The PUCCH resource set information may include a list (for example, resourceList) of PUCCH resource indices (IDs, for example, PUCCH-ResourceId).

When the UE does not have dedicated PUCCH resource configuration information (for example, dedicated PUCCH resource configuration) provided by the PUCCH resource set information in the PUCCH configuration information (before RRC setup), the UE may determine the PUCCH resource set, based on a parameter (for example, pucch-ResourceCommon) in system information (for example, System Information Block Type 1 (SIB1) or Remaining Minimum System Information (RMSI)). The PUCCH resource set may include 16 PUCCH resources.

On the other hand, if the UE has the dedicated PUCCH resource configuration information (UE-dedicated uplink control channel configuration, dedicated PUCCH resource configuration) (after RRC setup), the UE may determine the PUCCH resource set according to the number of UCI information bits.

The UE may determine one PUCCH resource (index) in the PUCCH resource set (for example, the PUCCH resource set determined to be specific to the cell or dedicated to the UE), based on at least one of a value of a field (for example, a PUCCH resource indication (PUCCH resource indicator) field) in downlink control information (DCI) (for example, DCI format 1_0 or 1_1 used for scheduling of the PDSCH), the number ($N_{CCE}$) of CCEs in the control resource set (CORESET) for PDCCH reception for carrying the DCI, and an index ($n_{CCE,0}$) of the head (first) CCE of the PDCCH reception.

The PUCCH spatial relation information (for example, "PUCCH-spatialRelationInfo" of the RRC information element) may indicate a plurality of candidate beams (spatial domain filters) for PUCCH transmission. The PUCCH spatial relation information may indicate a spatial relationship between the RS (Reference signal) and the PUCCH.

The list of pieces of PUCCH spatial relation information may include some elements (PUCCH spatial relation information IEs (Information Elements)). Each piece of PUCCH spatial relation information may include, for example, at least one of pieces of information related to an index (ID, for example, pucch-SpatialRelationInfoId) of the PUCCH spatial relation information, an index (ID, for example, servingCellId) of the serving cell, and an RS (reference RS) to be in spatial relation with the PUCCH.

For example, information related to the RS may be an SSB index, a CSI-RS index (for example, an NZP-CSI-RS resource configuration ID), or an SRS resource ID and an ID of the BWP. The SSB index, the CSI-RS index, and the SRS resource ID may be associated with at least one of a beam, a resource, and a port selected through measurement of a corresponding RS.

When more than one piece of spatial relation information related to the PUCCH is configured for the UE, the UE may perform control such that one piece of PUCCH spatial relation information is active for one PUCCH resource at certain time, based on a PUCCH spatial relation activation/deactivation MAC CE.

The PUCCH spatial relation activation/deactivation MAC CE according to Rel-15 NR is expressed with a total of three octets (8 bits×3=24 bits) of octets (Octs) 1 to 3.

The MAC CE may include information of a serving cell ID ("Serving Cell ID" field) of an application target, a BWP ID ("BWP ID" field), a PUCCH resource ID ("PUCCH Resource ID" field), and the like.

The MAC CE includes a field of "$S_i$" (i=0 to 7). When the field of certain $S_i$ indicates 1, the UE activates the spatial relation information of spatial relation information ID When the field of certain $S_i$ indicates 0, the UE deactivates the spatial relation information of spatial relation information ID #i.

3 ms after transmission of a positive acknowledgment (ACK) for the MAC CE for activating the PUCCH spatial relation information, the UE may activate the PUCCH relation information specified by the MAC CE.

<Spatial Relation for SRS and PUSCH>

The UE may receive information (SRS configuration information, for example, a parameter in "SRS-Config" of the RRC control element) that is used for transmission of a reference signal for measurement (for example, a sounding reference signal (SRS)).

Specifically, the UE may receive at least one of information related to one or a plurality of SRS resource sets (SRS resource set information, for example, "SRS-ResourceSet" of the RRC control element) and information related to one or a plurality of SRS resources (SRS resource information, for example, "SRS-Resource" of the RRC control element).

One SRS resource set may be related to some SRS resources (some SRS resources may be grouped together). Each SRS resource may be identified by an SRS resource identifier (SRS Resource Indicator (SRI)) or an SRS resource ID (Identifier).

The SRS resource set information may include information of an SRS resource set ID (SRS-ResourceSetId), a list of SRS resource IDs (SRS-ResourceId) used in the resource set, an SRS resource type, and a usage of the SRS.

Here, the SRS resource type may indicate any one of a periodic SRS (P-SRS), a semi-persistent SRS (SP-SRS), and an aperiodic SRS (A-SRS or AP-SRS). Note that the UE may periodically (or periodically after activation) transmit the P-SRS and the SP-SRS, and transmit the A-SRS, based on an SRS request of the DCI.

The usage ("usage" of an RRC parameter, "SRS-SetUse" of an L1 (Layer-1) parameter) may be, for example, beam management (beamManagement), codebook-based transmission (codebook (CB)), non-codebook-based transmission (nonCodebook (NCB)), antenna switching (antennaSwitching), or the like. The SRS of the usage of codebook-based transmission or non-codebook-based transmission may be used for determination of a precoder of codebook-based or non-codebook-based PUSCH transmission based on the SRI.

For example, in a case of codebook-based transmission, the UE may determine a precoder for PUSCH transmission, based on the SRI, a transmitted rank indicator (TRI), and a transmitted precoding matrix indicator (TPMI). In a case of non-codebook-based transmission, the UE may determine a precoder for PUSCH transmission, based on the SRI.

The SRS resource information may include an SRS resource ID (SRS-ResourceId), the number of SRS ports, an SRS port number, transmission Comb, SRS resource mapping (for example, a time and/or frequency resource position, a resource offset, a period of resources, the number of repetitions, the number of SRS symbols, an SRS bandwidth, or the like), hopping related information, an SRS resource type, a sequence ID, spatial relation information of the SRS, or the like.

The spatial relation information (for example, "spatialRelationInfo" of the RRC information element) of the SRS may indicate spatial relation information between a certain reference signal and the SRS. The reference signal may be at least one of a synchronization signal/broadcast channel (Synchronization Signal/Physical Broadcast Channel (SS/PBCH)) block, a channel state information reference signal (CSI-RS), and an SRS (for example, another SRS). The SS/PBCH block may be referred to as a synchronization signal block (SSB).

The spatial relation information of the SRS may include at least one of an SSB index, a CSI-RS resource ID, and an SRS resource ID as an index of the reference signal.

Note that, in the present disclosure, an SSB index, an SSB resource ID, and an SSBRI (SSB Resource Indicator) may be interchangeably interpreted. A CSI-RS index, a CSI-RS resource ID, and a CRI (CSI-RS Resource Indicator) may be interchangeably interpreted. An SRS index, an SRS resource ID, and an SRI may be interchangeably interpreted.

The spatial relation information of the SRS may include a serving cell index, a BWP index (BWP ID), or the like corresponding to the reference signal.

In NR, transmission of an uplink signal may be controlled based on whether or not there is beam correspondence (BC). BC may be, for example, capability of a certain node (for example, the base station or the UE) of determining a beam (transmit beam, Tx beam) used for transmission of a signal, based on a beam (receive beam, Rx beam) used for reception of a signal.

Note that BC may be referred to as transmit/receive beam correspondence (Tx/Rx beam correspondence), beam reciprocity, beam calibration, calibrated/non-calibrated, reciprocity calibrated/non-calibrated, a correspondence degree, a matching degree, or the like.

For example, in a case without BC, the UE may transmit an uplink signal (for example, the PUSCH, the PUCCH, the SRS, or the like) by using the same beam (spatial domain transmission filter) as the SRS (or the SRS resource) indicated by the base station based on measurement results of one or more SRSs (or SRS resources).

On the other hand, in a case with BC, the UE may transmit an uplink signal (for example, the PUSCH, the PUCCH, the SRS, or the like) by using a beam (spatial domain transmission filter) the same as or corresponding to a beam (spatial domain reception filter) used for reception of an SSB or CSI-RS (or CSI-RS resource).

When, regarding a certain SRS resource, the spatial relation information related to the SSB or the CSI-RS and the SRS is configured for the UE (for example, in a case with BC), the UE may transmit the SRS resource by using a spatial domain filter (spatial domain transmission filter) the same as the spatial domain filter (spatial domain reception filter) for reception of the SSB or the CSI-RS. In this case, the UE may assume that the UE receive beam of the SSB or the CSI-RS and the UE transmit beam of the SRS are the same.

When, regarding a certain SRS (target SRS) resource, the spatial relation information related to another SRS (reference SRS) and the SRS (target SRS) is configured for the UE (for example, in a case without BC), the UE may transmit the target SRS resource by using a spatial domain filter (spatial domain transmission filter) the same as the spatial domain filter (spatial domain transmission filter) for transmission of the reference SRS. In other words, in this case, the UE may assume that the UE transmit beam of the reference SRS and the UE transmit beam of the target SRS are the same.

Based on a value of a field (for example, an SRS resource identifier (SRI) field) in DCI (for example, DCI format 0_1), the UE may determine spatial relation of the PUSCH scheduled by the DCI. Specifically, the UE may use, for PUSCH transmission, the spatial relation information (for example, "spatialRelationInfo" of an RRC information element) of the SRS resource determined based on a value (for example, the SRI) of the field.

When codebook-based transmission is used for the PUSCH, for the UE, two SRS resources may be configured by RRC, and one of the two SRS resources may be indicated by DCI (a field of 1 bit). When non-codebook-based transmission is used for the PUSCH, for the UE, four SRS resources may be configured by RRC, and one of the four SRS resources may be indicated by DCI (a field of 2 bits). To use spatial relation other than the spatial relation of two or four configured by RRC, RRC reconfiguration is required.

Note that the DL-RS can be configured for the spatial relation of the SRS resources used for the PUSCH. For example, regarding the SP-SRS, for the UE, spatial relation of a plurality (for example, up to 16) SRS resources can be configured by RRC, and one of the plurality of SRS resources can be indicated by the MAC CE.

(Update of Beam Index)

In existing systems (for example, Rel. 15), when a plurality of cells are configured, beam indication for each cell needs to be performed by using the MAC CE specific to each cell. For example, when the base station updates the TCI state or the beam index of each cell, the base station notifies the UE by using the MAC CE specific to each cell. Note that, in this specification, update, activate, and switch may be interchangeably interpreted.

In contrast, in future radio communication systems (for example, Rel. 16 or later versions), support of configuration of controlling beam indication for a plurality of cells or the bandwidth part (BWP) using one piece of update indication information (for example, a MAC CE) is assumed. For example, when the base station updates the TCI state or the beam index of each cell or each BWP (hereinafter simply referred to as a cell), the base station may notify the UE of update of a plurality of cells by using one MAC CE for a certain cell (see FIG. 1).

FIG. 1 shows an example of update control of the TCI state when update of the TCI state (for example, activation of TCI state #3) for CC #0 is indicated. When the UE receives the MAC CE indicating update of the TCI state of CC #0, the UE may perform update of the TCI states of other CCs (here, CC #1 to CC #3), in addition to the TCI state of CC #0. Note that information related to the CC to be updated by the UE may be notified or configured from the base station to the UE by using a certain higher layer parameter (for example, applicable-CC-list).

(Known/Unknown of TCI State)

The UE for which update of the TCI state to be active using the MAC CE is indicated may control application of the TCI state after update (for example, timing of applying the TCI state after update or the like), based on whether the TCI state after update is recognized or not recognized.

"The TCI state is recognized" may be interpreted as "the TCI state is known," "the TCI state is understood," "the TCI state has been measured," and "a certain condition is satisfied regarding the TCI state." "The TCI state is not recognized" may be interpreted as "the TCI state is unknown," "the TCI state is not understood," "the TCI state has not been measured (unmeasured)," and "a certain condition is not satisfied regarding the TCI state."

When an active TCI state is updated by the MAC CE, from when the TCI state after update (target TCI state) is applied may depend on whether or not the target TCI state is known (measured). When the target TCI is unknown (unmeasured), the UE may apply the target TCI state after the time when the target TCI becomes known.

When the following plurality of known conditions for the TCI state (known conditions for TCI state, conditions for the TCI state to be considered known) are satisfied, it may be determined that the target TCI state is known.

<Known Conditions>

In a period (TCI switch period, TCI switching period) from the last transmission of an RS resource used for an L1-RSRP measurement report for the target TCI state to completion of active TCI state switch, the RS resource for the L1-RSRP measurement is an RS in the target TCI state or an RS QCLed with the target TCI state.

In the TCI switch period, a TCI state switch command is received within 1280 ms from the last transmission of the RS resource for report or measurement of a beam.

In the TCI switch period, the UE transmits at least one L1-RSRP report for the target TCI state before the TCI state switch command.

In the TCI switch period, the target TCI state is in a detectable state (detectable).

In the TCI switch period, the SSB associated with the target TCI state is in a detectable state.

In the TCI switch period, the signal-to-noise ratio (SNR) of the target TCI state is −3 dB or higher.

When the plurality of known conditions for the TCI state are not satisfied, it may be determined that the target TCI state is unknown.

Incidentally, when the TCI states in a plurality of cells or CCs are updated using one MAC CE (or a common MAC CE), whether or not the UE recognizes the TCI state after update in each cell (known or unknown) poses a problem. For example, when the TCI states for other cells are also updated in addition to the TCI state of a certain cell, based on information of update indication of the TCI state for the certain cell, the UE has not necessarily recognized (or known) the TCI state after update in each cell all the time. There is a possibility that the TCI state after update is known for the certain cell, but the TCI state after update is unknown in another cell (see FIG. 2).

Figure 2:
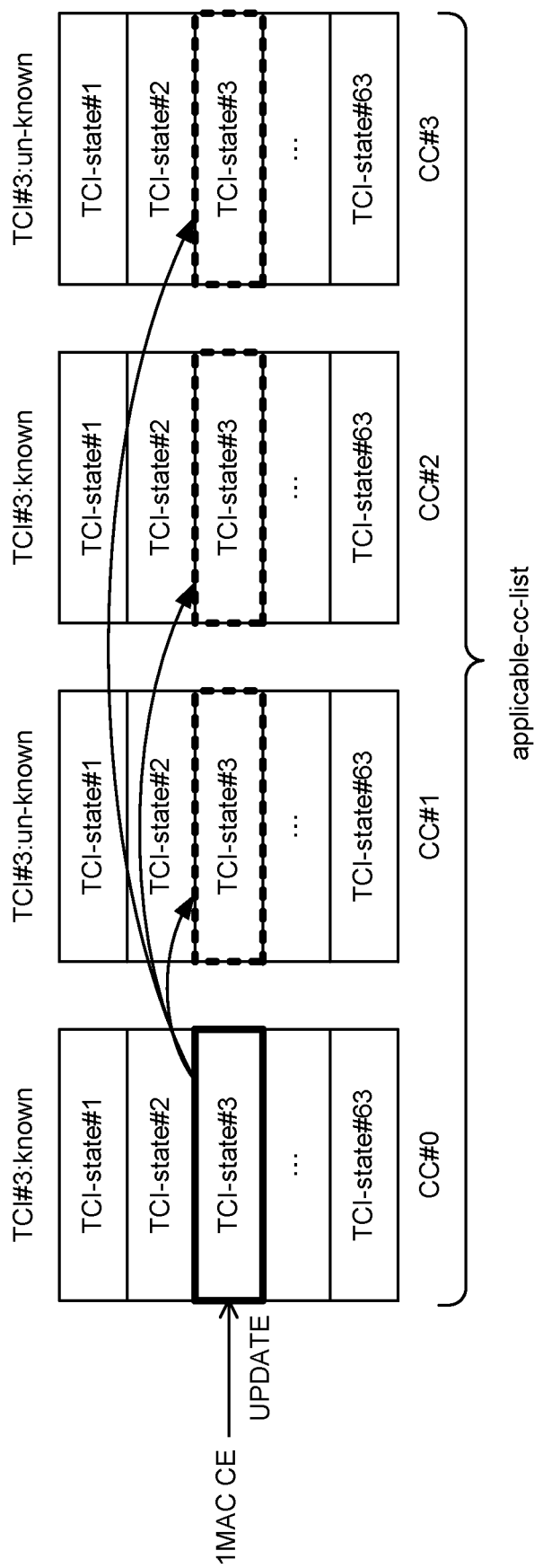
FIG. 2 is a diagram to show another example of the case in which update of TCI states of a plurality of CCs is performed using one MAC CE.

FIG. 2 shows a case in which update of the TCI state (for example, activation of TCI state #3) for cell #0 (or CC #0) is notified using the MAC CE, and the TCI states of other cells (here, CCs #1 to #3) are also updated based on the MAC CE. FIG. 2 shows a case in which the UE has recognized TCI state #3 after update regarding CC #0 and CC #2, and has not recognized TCI state #3 after update regarding CC #1 and CC #3.

In such a case, how to control update (for example, update timing or the like) of the TCI state in each cell poses a problem. Unless update of the TCI state in each cell is appropriately performed, communication quality may be deteriorated.

The inventors of the present invention focused on a point that a recognition state (known/unknown) of the TCI state after update may be different in each cell when update of the TCI states of a plurality of cells is performed based on one piece of (or common) information, and came up with the idea of a method of appropriately performing update of the TCI state in each cell even when such a case occurs.

Embodiments according to the present disclosure will be described in detail below with reference to the drawings. Radio communication methods according to respective embodiments may each be employed individually, or may be employed in combination.

In the present disclosure, "A/B" and "at least one of A and B" may be interchangeably interpreted. In the present disclosure, a cell, a CC, a carrier, a BWP, and a band may be interchangeably interpreted. In the present disclosure, an index, an ID, an indicator, and a resource ID may be interchangeably interpreted.

In the present disclosure, a TCI state, a QCL assumption, a QCL parameter, a spatial domain reception filter, a UE spatial domain reception filter, a UE receive beam, a DL receive beam, DL precoding, a DL precoder, a DL-RS, an RS of QCL type D of a TCI state or a QCL assumption, and an RS of QCL type A of a TCI state or a QCL assumption may be interchangeably interpreted. In the present disclosure, an RS of QCL type D, a DL-RS associated with QCL type D, a DL-RS having QCL type D, a source of a DL-RS, an SSB, and a CSI-RS may be interchangeably interpreted.

In the present disclosure, spatial relation, spatial relation information, spatial relation assumption, a QCL parameter, a spatial domain transmission filter, a UE spatial domain transmission filter, a UE transmit beam, a UL transmit beam, UL precoding, a UL precoder, an RS of spatial relation, a DL-RS, a QCL assumption, an SRI, spatial relation based on an SRI, and a UL TCI may be interchangeably interpreted.

In the present disclosure, a TRS, a CSI-RS for tracking, a CSI-RS having TRS information (higher layer parameter trs-Info), and an NZP-CSI-RS resource in an NZP-CSI-RS resource set having TRS information may be interchangeably interpreted.

In the present disclosure, DCI format 0_0, DCI not including an SRI, DCI not including an indication of spatial relation, and DCI not including a CIF may be interchangeably interpreted. In the present disclosure, DCI format 0_1, DCI including an SRI, DCI including an indication of spatial relation, and DCI including a CIF may be interchangeably interpreted.

In the present disclosure, a TCI state updated by a MAC CE, a TCI state activated by a MAC CE, and a TCI state indicated by a MAC CE, and a target TCI state may be interchangeably interpreted.

(First Aspect)

A first aspect will describe an example of a case in which update of the TCI states of a plurality of cells is controlled based on one piece of (or common) information.

When the UE receives certain information for notification of update of the TCI state, the UE may perform update of the TCI states of a plurality of cells collectively for the cells or for each cell at certain timing. Information related to the plurality of cells whose TCI states are to be updated based on the certain information may be notified or configured from the network (for example, the base station) to the UE.

For example, the base station notifies the UE of the information related to the plurality of cells by using a certain higher layer parameter (for example, applicable-CC-list). The information related to the plurality of cells may be information indicating a list (also referred to as an application cell list or applicable-CC-list) including cell indices. When the UE receives the certain information for notification of update of the TCI state for a certain cell, the UE may perform control to update the TCI state of the cell and the TCI states of cells included in the application cell list notified using the certain higher layer parameter.

A plurality of application cell lists (or applicable-CC-list) may be configured for the UE. The UE may select the application cell list, based on information notified from the base station or another condition.

The UE may control update of the TCI states of the plurality of cells, based on at least one of the following update timing controls 1 to 3. The following description will show a case in which update of the TCI state is notified to the UE by using the MAC CE. However, the certain information used for notification of update of the TCI state is not limited thereto.

<Update Timing Control 1>

When update of the TCI state (for example, the TCI state of a certain cell) is indicated for the UE by using the MAC CE, the UE may perform control to update the TCI state(s) of one or more cells included in the application cell list at the same timing (or in the same timeline). In other words, when update of the TCI state for a certain cell is indicated for the UE, the UE may perform update of the TCI state in the cell and update of the TCI states in other cells included in the application cell list at the same timing (see FIG. 3).

Figure 3:
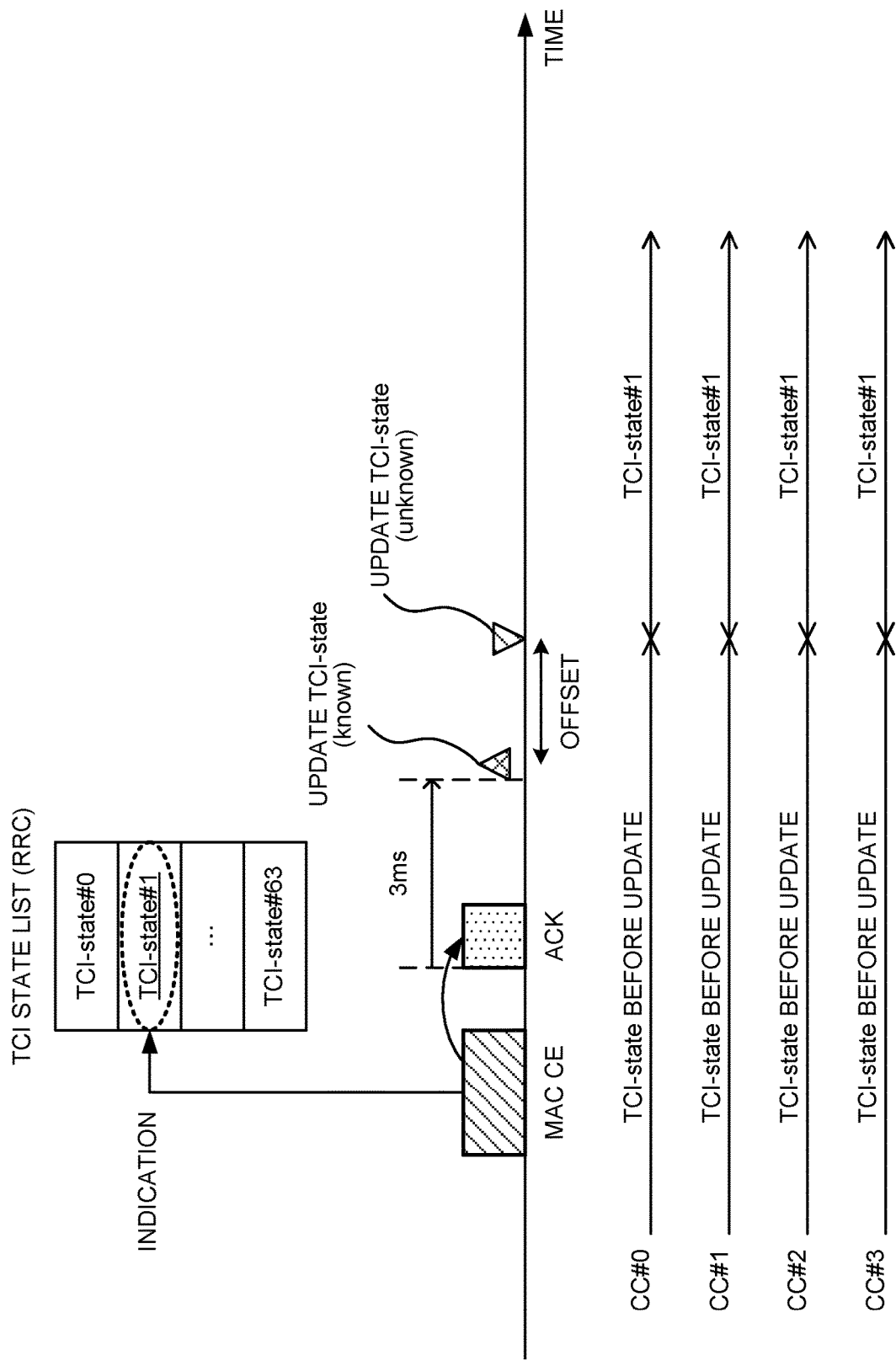
FIG. 3 is a diagram to show an example of update control of TCI states in a first aspect.

FIG. 3 shows an example of update control of the TCI state when update of the TCI state (for example, activation of TCI state #1) is indicated for CC #0. FIG. 3 shows a case in which CC #0, CC #1, CC #2, and CC #3 are included in the application cell list.

When the UE receives the MAC CE indicating update of the TCI state of CC #0, the UE may update the TCI state (for example, apply or activate TCI state #1) regarding all of the cells (here, CC #0 to CC #3) included in the application cell list at the same timing after a certain period. The timing at which update of the TCI states of the plurality of cells is performed may be determined in consideration of an offset configured after transmission of a positive acknowledgment (ACK) for the MAC CE.

For example, the UE may update the TCI states of the respective cells (here, CC #0 to CC #3) after the elapse of a certain offset configured after transmission of a positive acknowledgment (ACK) for the MAC CE at the same timing. The offset may be timing (for example, update timing) at which application of the TCI state after update is allowed. The description herein shows a case in which the start position of the offset is configured 3 ms after transmission of an ACK. However, the start position of the offset is not limited thereto.

The offset may be configured to be common to the plurality of cells, or may be separately configured for each cell. For example, a first offset (or allowed update timing) configured when the TCI state after update is known and a second offset configured when the TCI state after update is unknown may be supported.

When the offset is configured for each of the plurality of cells (for example, different offsets are configured), the UE may determine the update timing, based on an offset having a long period (or having a large value) out of the offsets corresponding to respective cells. FIG. 3 shows a case in which, when the first offset corresponding to a part of cells (for example, CC #0 and CC #2) whose TCI states after update are known and the second offset corresponding to other cells (for example, CC #1 and CC #3) whose TCI states after update are unknown are configured, the update timing of the TCI states is controlled in consideration of the second offset.

With this, when the TCI states after update are unknown in a part of cells of the plurality of cells whose TCI states are to be updated, the TCI states of the respective cells can be updated at the timing when unknown of the part of the cells are taken into consideration (for example, after turning into a known state).

Figure 4:
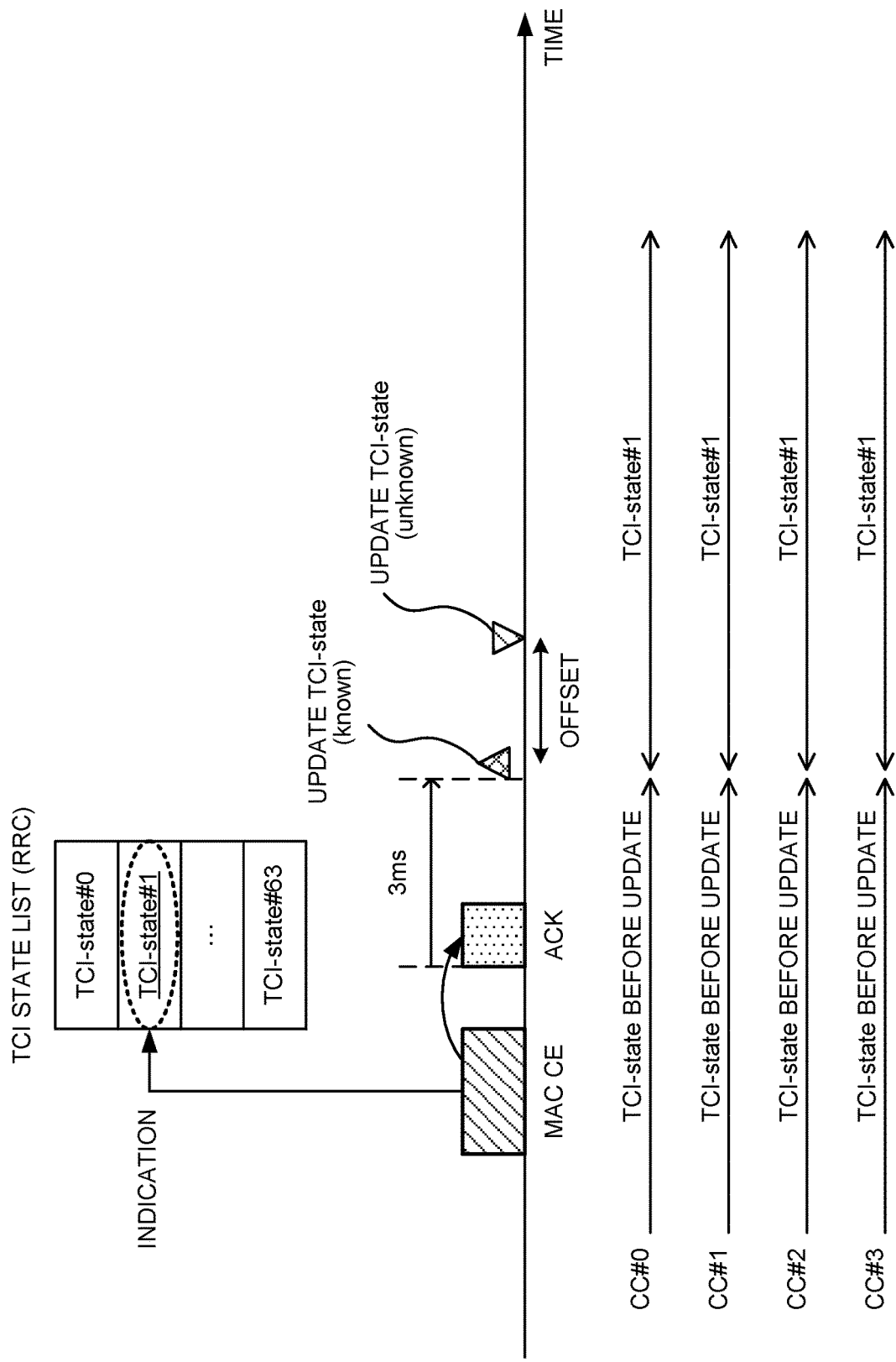
FIG. 4 is a diagram to show another example of the update control of the TCI states in the first aspect.

Alternatively, the UE may determine the update timing, based on an offset having a short period (or having a small value) out of the offsets corresponding to respective cells (see FIG. 4). FIG. 4 shows a case in which, when the first offset corresponding to a part of cells (for example, CC #0 and CC #2) whose TCI states after update are known and the second offset corresponding to other cells (for example, CC #1 and CC #3) whose TCI states after update are unknown are configured, the update timing of the TCI states is controlled in consideration of the first offset.

In this case, the UE may control reception of DL transmission by applying or assuming the TCI state after update (here, TCI state #1) during the offset period. Note that a condition (for example, performance requirement) required in DL reception processing may be mitigated in certain cells (for example, CC #1 and CC #3 being unknown) during the offset period.

With this, even when the TCI states after update are unknown in a part of cells of the plurality of cells whose TCI states are updated, a delay due to update of the TCI states can be prevented by advancing the update timing of the TCI states.

<Update Timing Control 2>

When update of the TCI state (for example, the TCI state of a certain cell) is indicated for the UE by using the MAC CE, the UE may perform control to update the TCI state(s) of one or more cells included in the application cell list at different timings (or in different timelines). In other words, when update of the TCI state for a certain cell is indicated for the UE, the UE may perform update of the TCI state in the cell and update of the TCI states in other cells included in the application cell list at different timings (see FIG. 5).

Figure 5:
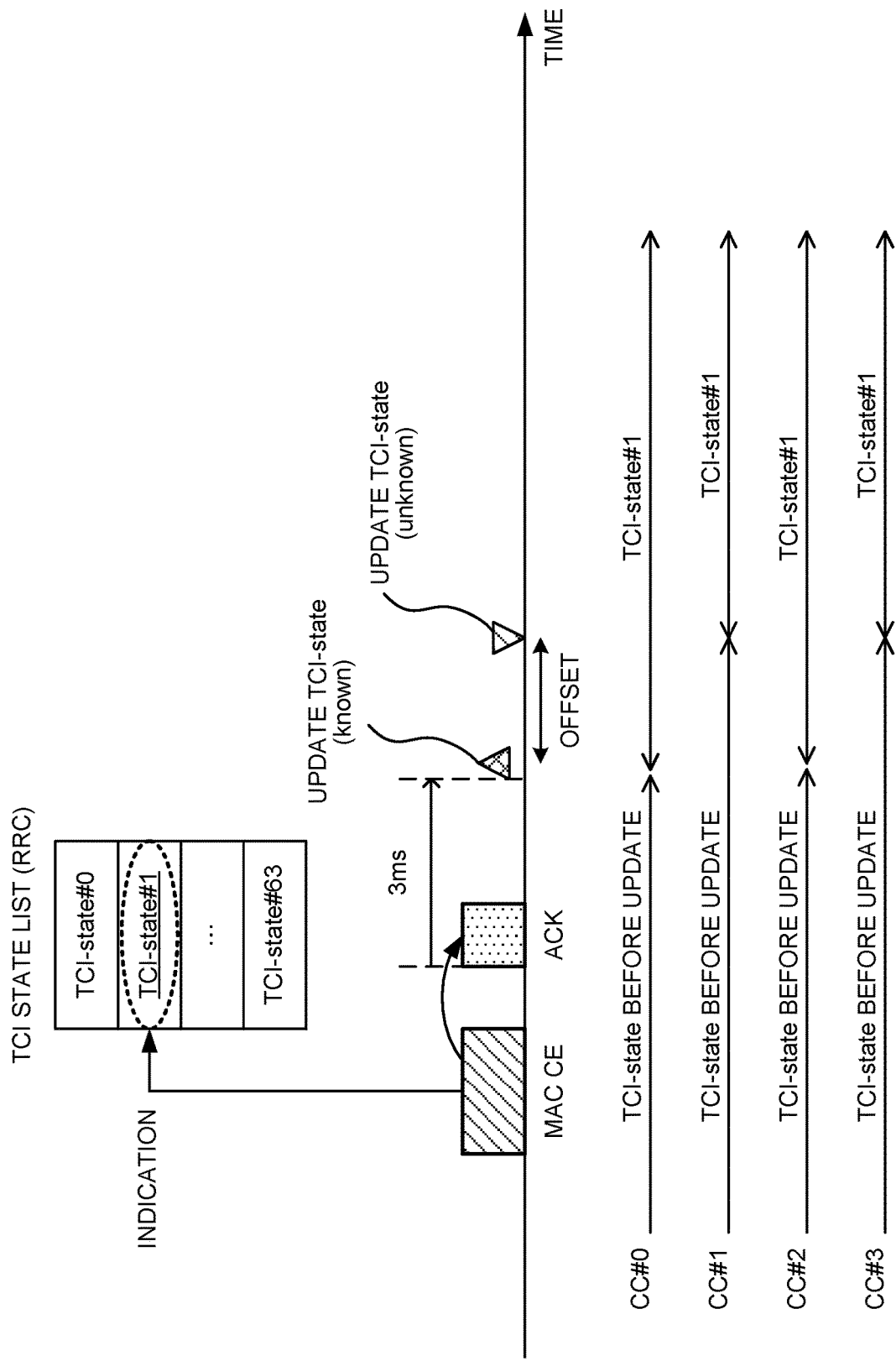
FIG. 5 is a diagram to show another example of the update control of the TCI states in the first aspect.

FIG. 5 shows an example of update control of a TCI state when update of the TCI state (for example, activation of TCI state #1) is indicated for CC #0. FIG. 5 shows a case in which CC #0, CC #1, CC #2, and CC #3 are included in the application cell list.

When the UE receives the MAC CE indicating update of the TCI state of CC #0, the UE may update the TCI state (for example, apply or activate TCI state #1) regarding all of the cells (here, CC #0 to CC #3) included in the application cell list at timing configured for each cell after a certain period. The timing at which update of the TCI states of the plurality of cells is performed may be determined in consideration of an offset configured for each cell after transmission of a positive acknowledgment (ACK) for the MAC CE.

For example, the UE may update the TCI states of the respective cells (here, CC #0 to CC #3) after the elapse of a certain offset configured after transmission of a positive acknowledgment (ACK) for the MAC CE, at different timings. Note that, in a part of cells, the TCI states may be updated at the same timing.

The offset may be separately configured for each cell. For example, a first offset (or allowed update timing) configured when the TCI state after update is known and a second offset configured when the TCI state after update is unknown may be supported.

When the offset is configured for each of the plurality of cells (or different offsets are configured), the UE may determine the update timing of the TCI states for each cell in consideration of the offset for each cell.

FIG. 5 shows a case in which the update timing of the TCI states is determined with the first offset being applied to a part of cells (for example, CC #0 and CC #2) whose TCI states after update are known. FIG. 5 further shows a case in which the update timing of the TCI states is determined with the second offset being applied to other cells (for example, CC #1 and CC #3) whose TCI states after update are unknown.

With this, even when the TCI states after update are unknown in a part of cells of the plurality of cells whose TCI states are to be updated, the update timing of the TCI states can be flexibly controlled for each cell, based on a recognition state (known/unknown) of the TCI state after update in each cell.

<Update Timing Control 3>

When update of the TCI state (for example, the TCI state of a certain cell) is indicated for the UE by using the MAC CE, the UE may control application of the offset, based on a recognition state (known/unknown) of the TCI state after update in the TCI state included in the application cell list.

When the TCI state after update is known in all of the cells included in the application cell list, the UE may apply the TCI state after update to all of the cells after completion of update (or activation) of the TCI state. Completion of update (or activation) of the TCI state may be after transmission or at the time of transmission of a positive acknowledgment (ACK) for the MAC CE. In this case, the offset may be 0.

Alternatively, when there is an offset configured when the TCI state after update is known, completion of update (or activation) of the TCI state may be after the offset.

In contrast, when the TCI state after update is unknown in all of the cells included in the application cell list, the UE may apply the TCI state after update in each cell after the elapse of an offset configured after reception of the MAC CE (or after transmission of a positive acknowledgment (ACK) for the MAC CE).

The offset may be time or an offset defined in a specification (for example, RAN 4) before an unknown TCI state can be applied. Alternatively, the offset may be time or an offset before an unknown TCI state becomes a known TCI state.

When the TCI state after update is known in a part of cells included in the application cell list and the TCI state after update is unknown in other cells, at least one of update timing control 1 and update timing control 2 described above may be applied.

(Second Aspect)

The first aspect described above shows a case in which an offset is configured in association with known/unknown. However, a value of the offset is not limited thereto. The offset may be configured using an RRC parameter, may be defined in a specification, or may be a value reported with UE capability information. The offset may be one of the following offsets 1 to 5.

{Offset 1}

0 (zero). Update of the TCI state may be a certain period (for example, 3 ms) after ACK transmission for the MAC CE. For example, the offset of 0 may be used as switch timing of the TCI state when the TCI state after update (target TCI state) is known (see update timing controls 2 and 3 in the first aspect).

Alternatively, the offset of 0 may be applied to switch timing of the TCI state when the target TCI state is unknown (see FIG. 4 described above).

{Offset 2} x [ms] or x [slot]. x may be defined in a specification, or may be configured using an RRC parameter. x may depend on a subcarrier spacing (SCS) or a slot length. x may be defined with absolute time, or may be defined with a multiple of a certain time unit (for example, at least one of a symbol, a sub-slot, a subframe, a slot, and a frame).

{Offset 3}

Offset for switching spatial relation, based on the MAC CE. The offset may be defined in a specification, or may be configured using an RRC parameter. For example, when the target TCI state is known, the offset may be $TO_k^*(T_{first\text{-}SSB}+T_{SSB\text{-}proc})$ When the target TCI state is unknown, the offset may be $T_{L1\text{-}RSRP}+TO_{uk}^*(T_{first\text{-}SSB}+T_{SSB\text{-}proc})$ {Offset 4}

Time necessary for TCI state switch when the target TCI state is unknown. For example, the offset may be time based on time $T_{L1}$-RSRP for L1-RSRP measurement, or may be $T_{L1\text{-}RSRP}+TO_{uk}^*(T_{first\text{-}SSB}+T_{SSB\text{-}proc})$ {Offset 5}

Time before the target TCI state becomes known from being unknown. For example, the offset may be time based on time $T_{L1\text{-}RSRP}$ for L1-RSRP measurement, or may be $T_{L1\text{-}RSRP}$ (Third Aspect)

The offset of the first aspect or the second aspect described above may be different for each channel/signal (or channel type/signal type, channel category/signal category) to be applied. The channel/signal may be at least one of a PDCCH, a PDSCH, a PUCCH, and an SRS.

For example, an offset used for update of the TCI state corresponding to a first channel/signal (for example, a PDCCH) and an offset used for update of the TCI state corresponding to a second channel/signal (for example, a PDSCH) may be separately configured.

Regarding the PDCCH, a different offset may be applied or configured for each corresponding CORESET. For example, an offset used for update of the TCI state of the PDCCH corresponding to a first CORESET and an offset used for update of the TCI state of the PDCCH corresponding to a second CORESET may be separately configured.

In this case, different offsets may correspond to a specific CORESET (for example, CORESET #0) and CORESETs other than the specific CORESET. Alternatively, group indices (for example, TRP indices) may be configured, and offsets may be separately configured for a certain group (or CORESETs corresponding to the certain group) and another group (or CORESETs corresponding to such other group).

The offset may depend on whether or not the CORESET is configured for an active DL BWP on a CC. An offset when the CORESET is configured for the active DL BWP on the CC and an offset when the CORESET is not configured for the active DL BWP on the CC may be different from each other. When the CORESET is configured for the active DL BWP on the CC, the TCI state for the PDCCH may be updated. When the CORESET is not configured for the active DL BWP on the CC, the TCI state for the PDSCH may be updated.

(Variations)

The offset may have one of the following relationships 1 and 2, depending on whether the target TCI state is known or unknown.

{Relationship 1}

The offset depends on whether the target TCI state is known or unknown. Different offsets may be used for when the target TCI state is known and when the target TCI state is unknown.

When the target TCI state is known, the shorter offset (for example, 0) out of the two different offsets may be used. When the target TCI state is unknown, the longer offset (for example, larger than 0) out of the two different offsets may be used. The longer offset may be, for example, an offset defined before an unknown TCI state can be applied, or may be an offset before an unknown TCI state becomes a known TCI state.

{Relationship 2}

The offset does not depend on whether the target TCI state is known or unknown. The same offset may be used for when the target TCI state is known and when the target TCI state is unknown. The UE may determine a receive beam/transmit beam (may determine/measure an RS of QCL type D), based on an unknown TCI state.

Relationship 1 may be applied to the TCI state for a DL (for example, a PDCCH/PDSCH), and relationship 2 may be applied to the TCI state for a UL (SRS/PUCCH).

<UE Operation>

The UE may perform one of the following operations 1 and 2 in a period corresponding to the offset. The period corresponding to the offset may start a certain period (for example, 3 ms) after ACK transmission for the MAC CE, and have a length of the offset.

{Operation 1}

The UE may perform reception of a DL channel/signal/reference signal and transmission of a UL channel/signal and reference signal by applying/assuming spatial relation before update.

{Operation 2}

The UE may perform reception of a DL channel/signal/reference signal and transmission of a UL channel/signal and reference signal by applying/assuming spatial relation after update. In this case, a performance requirement may be mitigated in the period corresponding to the offset. For example, the performance requirement may be defined by at least one of a required SNR and a required error rate.

<Variations of UE Operation>

Update control of the TCI state described in the first aspect may be applied only when the TCI state after update (target TCI state) is known. When the TCI state after update is unknown, application (for example, count) of the offset may be started after a certain condition is satisfied and the TCI state after update becomes known.

When the TCI state after update is unknown in any one of the cells included in the application cell list, application (for example, start of count) of the offset may be performed after the TCI state after update becomes known in all of the cells.

(Radio Communication System)

Hereinafter, a structure of a radio communication system according to one embodiment of the present disclosure will be described. In this radio communication system, the radio communication method according to each embodiment of the present disclosure described above may be used alone or may be used in combination for communication.

Figure 6:
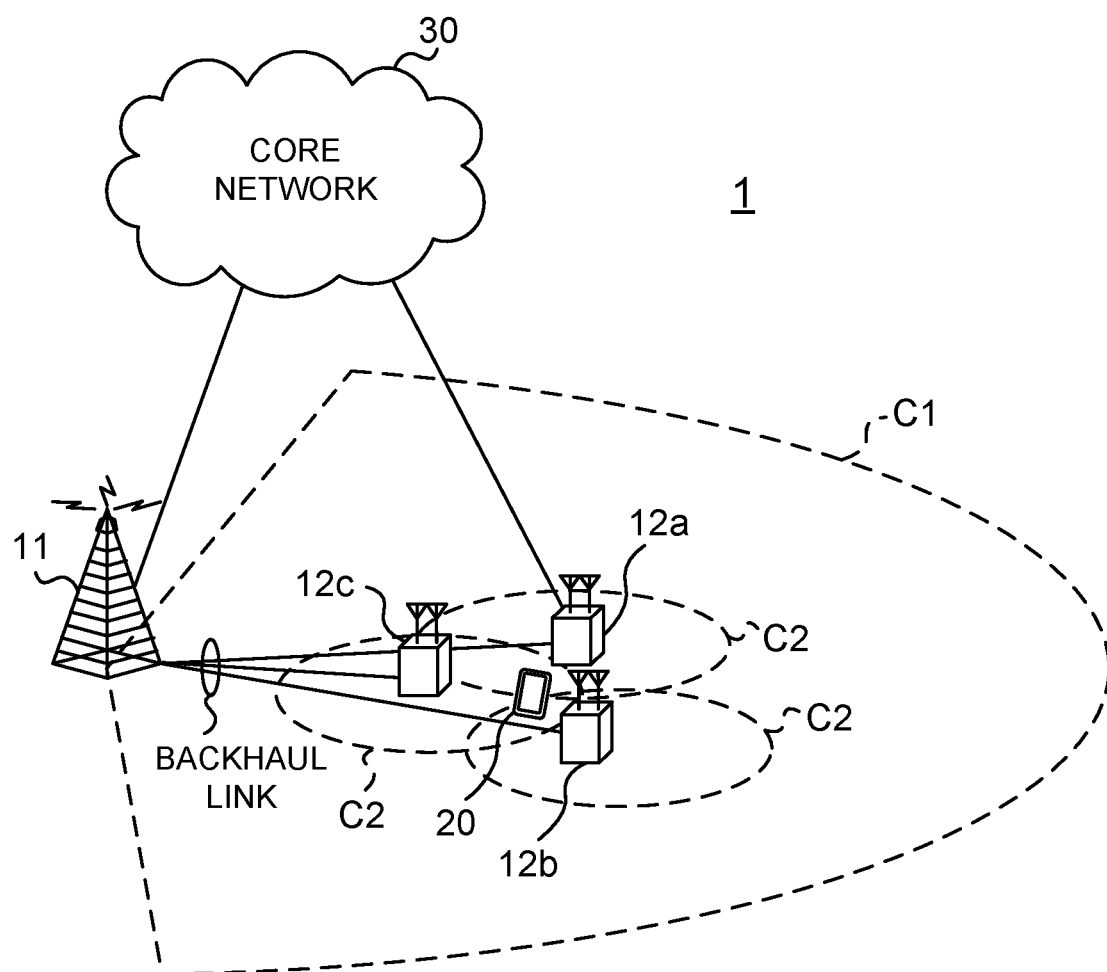
FIG. 6 is a diagram to show an example of a schematic structure of a radio communication system according to one embodiment.

FIG. 6 is a diagram to show an example of a schematic structure of the radio communication system according to one embodiment. The radio communication system 1 may be a system implementing a communication using Long Term Evolution (LTE), 5th generation mobile communication system New Radio (5G NR) and so on the specifications of which have been drafted by Third Generation Partnership Project (3GPP).

The radio communication system 1 may support dual connectivity (multi-RAT dual connectivity (MR-DC)) between a plurality of Radio Access Technologies (RATs). The MR-DC may include dual connectivity (E-UTRA-NR Dual Connectivity (EN-DC)) between LTE (Evolved Universal Terrestrial Radio Access (E-UTRA)) and NR, dual connectivity (NR-E-UTRA Dual Connectivity (NE-DC)) between NR and LTE, and so on.

In EN-DC, a base station (eNB) of LTE (E-UTRA) is a master node (MN), and a base station (gNB) of NR is a secondary node (SN). In NE-DC, a base station (gNB) of NR is an MN, and a base station (eNB) of LTE (E-UTRA) is an SN.

The radio communication system 1 may support dual connectivity between a plurality of base stations in the same RAT (for example, dual connectivity (NR-NR Dual Connectivity (NN-DC)) where both of an MN and an SN are base stations (gNB) of NR).

The radio communication system 1 may include a base station 11 that forms a macro cell C1 of a relatively wide coverage, and base stations 12 (12a to 12c) that form small cells C2, which are placed within the macro cell C1 and which are narrower than the macro cell C1. The user terminal 20 may be located in at least one cell. The arrangement, the number, and the like of each cell and user terminal 20 are by no means limited to the aspect shown in the diagram. Hereinafter, the base stations 11 and 12 will be collectively referred to as "base stations 10," unless specified otherwise.

The user terminal 20 may be connected to at least one of the plurality of base stations 10. The user terminal 20 may use at least one of carrier aggregation (CA) and dual connectivity (DC) using a plurality of component carriers (CCs).

Each CC may be included in at least one of a first frequency band (Frequency Range 1 (FR1)) and a second frequency band (Frequency Range 2 (FR2)). The macro cell C1 may be included in FR1, and the small cells C2 may be included in FR2. For example, FR1 may be a frequency band of 6 GHz or less (sub-6 GHz), and FR2 may be a frequency band which is higher than 24 GHz (above-24 GHz). Note that frequency bands, definitions and so on of FR1 and FR2 are by no means limited to these, and for example, FR1 may correspond to a frequency band which is higher than FR2.

The user terminal 20 may communicate using at least one of time division duplex (TDD) and frequency division duplex (FDD) in each CC.

The plurality of base stations 10 may be connected by a wired connection (for example, optical fiber in compliance with the Common Public Radio Interface (CPRI), the X2 interface and so on) or a wireless connection (for example, an NR communication). For example, if an NR communication is used as a backhaul between the base stations 11 and 12, the base station 11 corresponding to a higher station may be referred to as an "Integrated Access Backhaul (IAB) donor," and the base station 12 corresponding to a relay station (relay) may be referred to as an "IAB node."

The base station 10 may be connected to a core network 30 through another base station 10 or directly. For example, the core network 30 may include at least one of Evolved Packet Core (EPC), 5G Core Network (5GCN), Next Generation Core (NGC), and so on.

The user terminal 20 may be a terminal supporting at least one of communication schemes such as LTE, LTE-A, 5G, and so on.

In the radio communication system 1, an orthogonal frequency division multiplexing (OFDM)-based wireless access scheme may be used. For example, in at least one of the downlink (DL) and the uplink (UL), Cyclic Prefix OFDM (CP-OFDM), Discrete Fourier Transform Spread OFDM (DFT-s-OFDM), Orthogonal Frequency Division Multiple Access (OFDMA), Single Carrier Frequency Division Multiple Access (SC-FDMA), and so on may be used.

The wireless access scheme may be referred to as a "waveform." Note that, in the radio communication system 1, another wireless access scheme (for example, another single carrier transmission scheme, another multi-carrier transmission scheme) may be used for a wireless access scheme in the UL and the DL.

In the radio communication system 1, a downlink shared channel (Physical Downlink Shared Channel (PDSCH)), which is used by each user terminal 20 on a shared basis, a broadcast channel (Physical Broadcast Channel (PBCH)), a downlink control channel (Physical Downlink Control Channel (PDCCH)) and so on, may be used as downlink channels.

In the radio communication system 1, an uplink shared channel (Physical Uplink Shared Channel (PUSCH)), which is used by each user terminal 20 on a shared basis, an uplink control channel (Physical Uplink Control Channel (PUCCH)), a random access channel (Physical Random Access Channel (PRACH)) and so on may be used as uplink channels.

User data, higher layer control information, System Information Blocks (SIBs) and so on are communicated on the PDSCH. User data, higher layer control information and so on may be communicated on the PUSCH. The Master Information Blocks (MIBs) may be communicated on the PBCH.

Lower layer control information may be communicated on the PDCCH. For example, the lower layer control information may include downlink control information (DCI) including scheduling information of at least one of the PDSCH and the PUSCH.

Note that DCI for scheduling the PDSCH may be referred to as "DL assignment," "DL DCI," and so on, and DCI for scheduling the PUSCH may be referred to as "UL grant," "UL DCI," and so on. Note that the PDSCH may be interpreted as "DL data", and the PUSCH may be interpreted as "UL data".

For detection of the PDCCH, a control resource set (CORESET) and a search space may be used. The CORESET corresponds to a resource to search DCI. The search space corresponds to a search area and a search method of PDCCH candidates. One CORESET may be associated with one or more search spaces. The UE may monitor a CORESET associated with a certain search space, based on search space configuration.

One search space may correspond to a PDCCH candidate corresponding to one or more aggregation levels. One or more search spaces may be referred to as a "search space set." Note that a "search space," a "search space set," a "search space configuration," a "search space set configuration," a "CORESET," a "CORESET configuration" and so on of the present disclosure may be interchangeably interpreted.

Uplink control information (UCI) including at least one of channel state information (CSI), transmission confirmation information (for example, which may be also referred to as Hybrid Automatic Repeat reQuest ACKnowledgement (HARQ-ACK), ACK/NACK, and so on), and scheduling request (SR) may be communicated by means of the PUCCH. By means of the PRACH, random access preambles for establishing connections with cells may be communicated.

Note that the downlink, the uplink, and so on in the present disclosure may be expressed without a term of "link." In addition, various channels may be expressed without adding "Physical" to the head.

In the radio communication system 1, a synchronization signal (SS), a downlink reference signal (DL-RS), and so on may be communicated. In the radio communication system 1, a cell-specific reference signal (CRS), a channel state information-reference signal (CSI-RS), a demodulation reference signal (DMRS), a positioning reference signal (PRS), a phase tracking reference signal (PTRS), and so on may be communicated as the DL-RS.

For example, the synchronization signal may be at least one of a primary synchronization signal (PSS) and a secondary synchronization signal (SSS). A signal block including an SS (PSS, SSS) and a PBCH (and a DMRS for a PBCH) may be referred to as an "SS/PBCH block," an "SS Block (SSB)," and so on. Note that an SS, an SSB, and so on may be also referred to as a "reference signal."

In the radio communication system 1, a sounding reference signal (SRS), a demodulation reference signal (DMRS), and so on may be communicated as an uplink reference signal (UL-RS). Note that DMRS may be referred to as a "user terminal specific reference signal (UE-specific Reference Signal)."

(Base Station)

Figure 7:
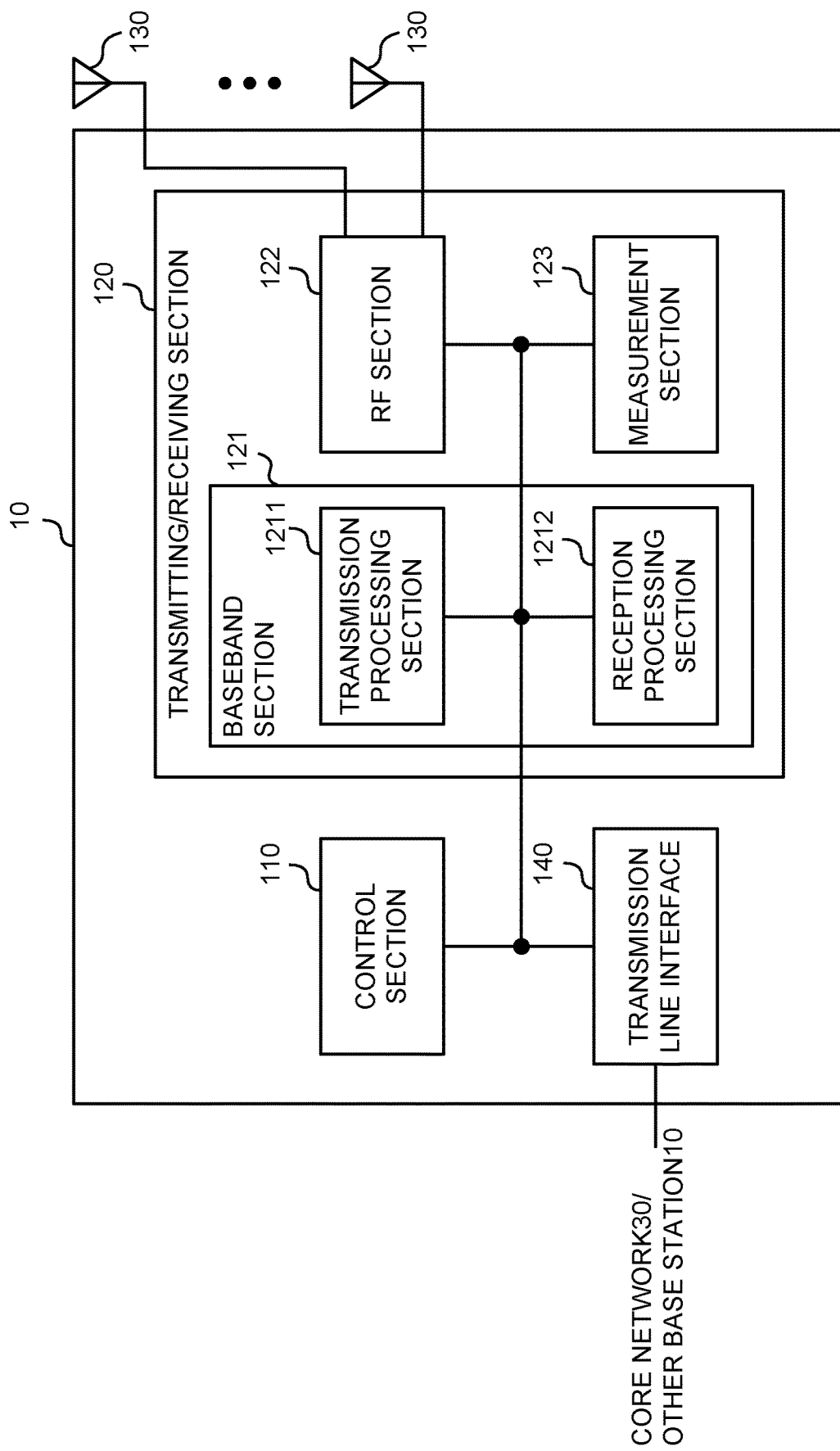
FIG. 7 is a diagram to show an example of a structure of a base station according to one embodiment.

FIG. 7 is a diagram to show an example of a structure of the base station according to one embodiment. The base station 10 includes a control section 110, a transmitting/receiving section 120, transmitting/receiving antennas 130 and a communication path interface (transmission line interface) 140. Note that the base station 10 may include one or more control sections 110, one or more transmitting/receiving sections 120, one or more transmitting/receiving antennas 130, and one or more communication path interfaces 140.

Note that, the present example primarily shows functional blocks that pertain to characteristic parts of the present embodiment, and it is assumed that the base station 10 may include other functional blocks that are necessary for radio communication as well. Part of the processes of each section described below may be omitted.

The control section 110 controls the whole of the base station 10. The control section 110 can be constituted with a controller, a control circuit, or the like described based on general understanding of the technical field to which the present disclosure pertains.

The control section 110 may control generation of signals, scheduling (for example, resource allocation, mapping), and so on. The control section 110 may control transmission and reception, measurement and so on using the transmitting/receiving section 120, the transmitting/receiving antennas 130, and the communication path interface 140. The control section 110 may generate data, control information, a sequence and so on to transmit as a signal, and forward the generated items to the transmitting/receiving section 120. The control section 110 may perform call processing (setting up, releasing) for communication channels, manage the state of the base station 10, and manage the radio resources.

The transmitting/receiving section 120 may include a baseband section 121, a Radio Frequency (RF) section 122, and a measurement section 123. The baseband section 121 may include a transmission processing section 1211 and a reception processing section 1212. The transmitting/receiving section 120 can be constituted with a transmitter/receiver, an RF circuit, a baseband circuit, a filter, a phase shifter, a measurement circuit, a transmitting/receiving circuit, or the like described based on general understanding of the technical field to which the present disclosure pertains.

The transmitting/receiving section 120 may be structured as a transmitting/receiving section in one entity, or may be constituted with a transmitting section and a receiving section. The transmitting section may be constituted with the transmission processing section 1211, and the RF section 122. The receiving section may be constituted with the reception processing section 1212, the RF section 122, and the measurement section 123.

The transmitting/receiving antennas 130 can be constituted with antennas, for example, an array antenna, or the like described based on general understanding of the technical field to which the present disclosure pertains.

The transmitting/receiving section 120 may transmit the above-described downlink channel, synchronization signal, downlink reference signal, and so on. The transmitting/receiving section 120 may receive the above-described uplink channel, uplink reference signal, and so on.

The transmitting/receiving section 120 may form at least one of a transmit beam and a receive beam by using digital beam forming (for example, precoding), analog beam forming (for example, phase rotation), and so on.

The transmitting/receiving section 120 (transmission processing section 1211) may perform the processing of the Packet Data Convergence Protocol (PDCP) layer, the processing of the Radio Link Control (RLC) layer (for example, RLC retransmission control), the processing of the Medium Access Control (MAC) layer (for example, HARQ retransmission control), and so on, for example, on data and control information and so on acquired from the control section 110, and may generate bit string to transmit.

The transmitting/receiving section 120 (transmission processing section 1211) may perform transmission processing such as channel coding (which may include error correction coding), modulation, mapping, filtering, discrete Fourier transform (DFT) processing (as necessary), inverse fast Fourier transform (IFFT) processing, precoding, digital-to-analog conversion, and so on, on the bit string to transmit, and output a baseband signal.

The transmitting/receiving section 120 (RF section 122) may perform modulation to a radio frequency band, filtering, amplification, and so on, on the baseband signal, and transmit the signal of the radio frequency band through the transmitting/receiving antennas 130.

On the other hand, the transmitting/receiving section 120 (RF section 122) may perform amplification, filtering, demodulation to a baseband signal, and so on, on the signal of the radio frequency band received by the transmitting/receiving antennas 130.

The transmitting/receiving section 120 (reception processing section 1212) may apply reception processing such as analog-digital conversion, fast Fourier transform (FFT) processing, inverse discrete Fourier transform (IDFT) processing (as necessary), filtering, de-mapping, demodulation, decoding (which may include error correction decoding), MAC layer processing, the processing of the RLC layer and the processing of the PDCP layer, and so on, on the acquired baseband signal, and acquire user data, and so on.

The transmitting/receiving section 120 (measurement section 123) may perform the measurement related to the received signal. For example, the measurement section 123 may perform Radio Resource Management (RRM) measurement, Channel State Information (CSI) measurement, and so on, based on the received signal. The measurement section 123 may measure a received power (for example, Reference Signal Received Power (RSRP)), a received quality (for example, Reference Signal Received Quality (RSRQ), a Signal to Interference plus Noise Ratio (SINR), a Signal to Noise Ratio (SNR)), a signal strength (for example, Received Signal Strength Indicator (RSSI)), channel information (for example, CSI), and so on. The measurement results may be output to the control section 110.

The communication path interface 140 may perform transmission/reception (backhaul signaling) of a signal with an apparatus included in the core network 30 or other base stations 10, and so on, and acquire or transmit user data (user plane data), control plane data, and so on for the user terminal 20.

Note that the transmitting section and the receiving section of the base station 10 in the present disclosure may be constituted with at least one of the transmitting/receiving section 120, the transmitting/receiving antennas 130, and the communication path interface 140.

The transmitting/receiving section 120 may transmit information related to update of a transmission configuration indication (TCI) state.

The control section 110 may determine that, when update of the TCI state of a plurality of cells is performed based on the information related to update of the TCI state, update timing of the TCI state in the plurality of cells is determined based on at least one of recognition or no recognition of the TCI state after update in the plurality of cells and an offset configured after transmission of a positive acknowledgment (ACK) for the information. The control section 110 may control transmission or reception of each channel/signal in consideration of the TCI state assumed by the UE.

(User Terminal)

Figure 8:
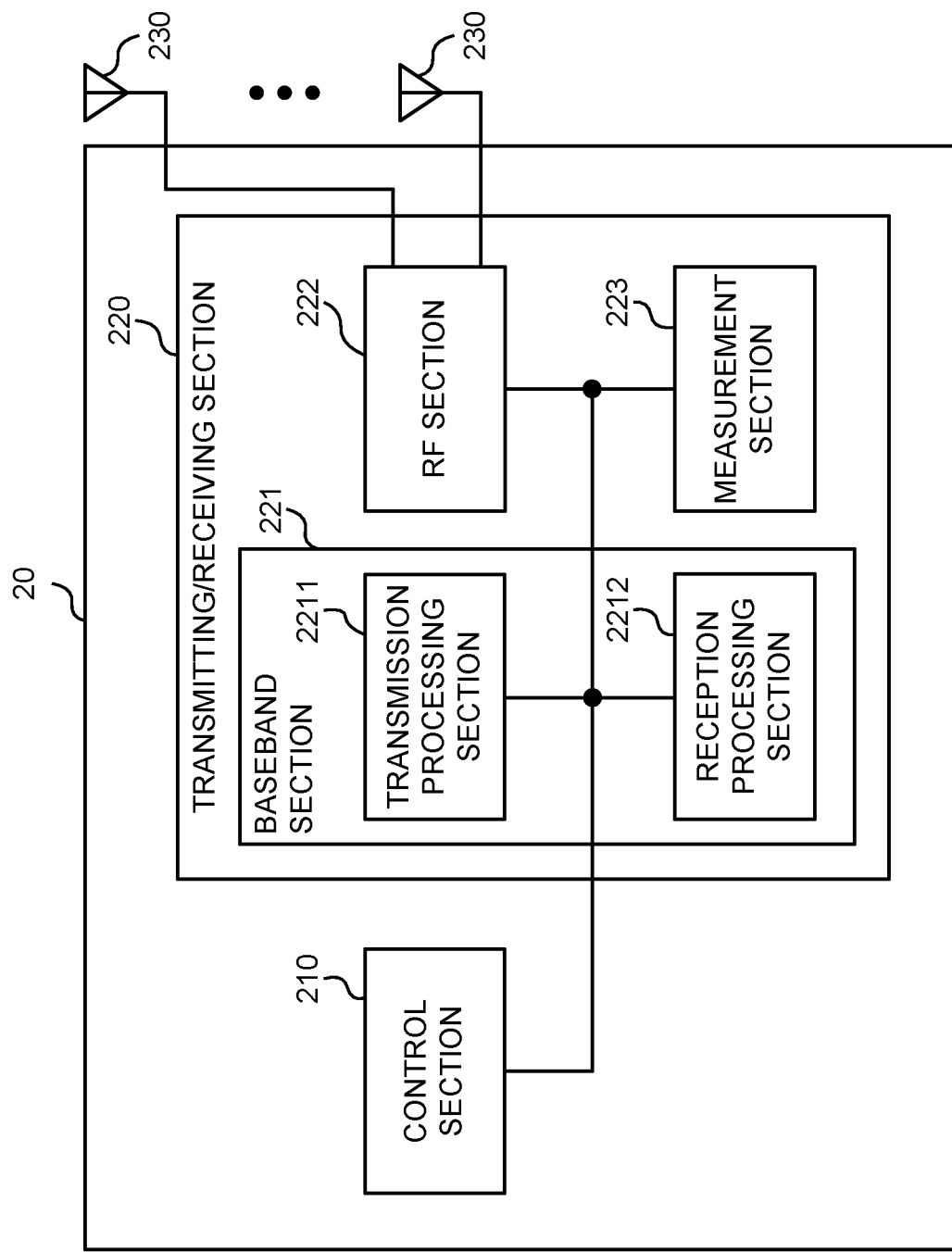
FIG. 8 is a diagram to show an example of a structure of a user terminal according to one embodiment.

FIG. 8 is a diagram to show an example of a structure of the user terminal according to one embodiment. The user terminal 20 includes a control section 210, a transmitting/receiving section 220, and transmitting/receiving antennas 230. Note that the user terminal 20 may include one or more control sections 210, one or more transmitting/receiving sections 220, and one or more transmitting/receiving antennas 230.

Note that, the present example primarily shows functional blocks that pertain to characteristic parts of the present embodiment, and it is assumed that the user terminal 20 may include other functional blocks that are necessary for radio communication as well. Part of the processes of each section described below may be omitted.

The control section 210 controls the whole of the user terminal 20. The control section 210 can be constituted with a controller, a control circuit, or the like described based on general understanding of the technical field to which the present disclosure pertains.

The control section 210 may control generation of signals, mapping, and so on. The control section 210 may control transmission/reception, measurement and so on using the transmitting/receiving section 220, and the transmitting/receiving antennas 230. The control section 210 generates data, control information, a sequence and so on to transmit as a signal, and may forward the generated items to the transmitting/receiving section 220.

The transmitting/receiving section 220 may include a baseband section 221, an RF section 222, and a measurement section 223. The baseband section 221 may include a transmission processing section 2211 and a reception processing section 2212. The transmitting/receiving section 220 can be constituted with a transmitter/receiver, an RF circuit, a baseband circuit, a filter, a phase shifter, a measurement circuit, a transmitting/receiving circuit, or the like described based on general understanding of the technical field to which the present disclosure pertains.

The transmitting/receiving section 220 may be structured as a transmitting/receiving section in one entity, or may be constituted with a transmitting section and a receiving section. The transmitting section may be constituted with the transmission processing section 2211, and the RF section 222. The receiving section may be constituted with the reception processing section 2212, the RF section 222, and the measurement section 223.

The transmitting/receiving antennas 230 can be constituted with antennas, for example, an array antenna, or the like described based on general understanding of the technical field to which the present disclosure pertains.

The transmitting/receiving section 220 may receive the above-described downlink channel, synchronization signal, downlink reference signal, and so on. The transmitting/receiving section 220 may transmit the above-described uplink channel, uplink reference signal, and so on.

The transmitting/receiving section 220 may form at least one of a transmit beam and a receive beam by using digital beam forming (for example, precoding), analog beam forming (for example, phase rotation), and so on.

The transmitting/receiving section 220 (transmission processing section 2211) may perform the processing of the PDCP layer, the processing of the RLC layer (for example, RLC retransmission control), the processing of the MAC layer (for example, HARQ retransmission control), and so on, for example, on data and control information and so on acquired from the control section 210, and may generate bit string to transmit.

The transmitting/receiving section 220 (transmission processing section 2211) may perform transmission processing such as channel coding (which may include error correction coding), modulation, mapping, filtering, DFT processing (as necessary), IFFT processing, precoding, digital-to-analog conversion, and so on, on the bit string to transmit, and output a baseband signal.

Note that, whether to apply DFT processing or not may be based on the configuration of the transform precoding. The transmitting/receiving section 220 (transmission processing section 2211) may perform, for a certain channel (for example, PUSCH), the DFT processing as the above-described transmission processing to transmit the channel by using a DFT-s-OFDM waveform if transform precoding is enabled, and otherwise, does not need to perform the DFT processing as the above-described transmission process.

The transmitting/receiving section 220 (RF section 222) may perform modulation to a radio frequency band, filtering, amplification, and so on, on the baseband signal, and transmit the signal of the radio frequency band through the transmitting/receiving antennas 230.

On the other hand, the transmitting/receiving section 220 (RF section 222) may perform amplification, filtering, demodulation to a baseband signal, and so on, on the signal of the radio frequency band received by the transmitting/receiving antennas 230.

The transmitting/receiving section 220 (reception processing section 2212) may apply a receiving process such as analog-digital conversion, FFT processing, IDFT processing (as necessary), filtering, de-mapping, demodulation, decoding (which may include error correction decoding), MAC layer processing, the processing of the RLC layer and the processing of the PDCP layer, and so on, on the acquired baseband signal, and acquire user data, and so on.

The transmitting/receiving section 220 (measurement section 223) may perform the measurement related to the received signal. For example, the measurement section 223 may perform RRM measurement, CSI measurement, and so on, based on the received signal. The measurement section 223 may measure a received power (for example, RSRP), a received quality (for example, RSRQ, SINR, SNR), a signal strength (for example, RSSI), channel information (for example, CSI), and so on. The measurement results may be output to the control section 210.

Note that the transmitting section and the receiving section of the user terminal 20 in the present disclosure may be constituted with at least one of the transmitting/receiving section 220 and the transmitting/receiving antennas 230.

The transmitting/receiving section 220 may receive information related to update of a transmission configuration indication (TCI) state.

The control section 210 may determine, when update of the TCI state of a plurality of cells is performed based on the information related to update of the TCI state, update timing of the TCI state in the plurality of cells, based on at least one of recognition or no recognition of the TCI state after update in the plurality of cells and an offset configured after transmission of a positive acknowledgment (ACK) for the information.

Even when the plurality of cells include cells whose recognition or no recognition of the TCI state after update are different from each other, the control section 210 may perform control to have update timing of the TCI state in the plurality of cells to be common. Alternatively, when the plurality of cells include cells whose recognition or no recognition of the TCI state after update are different from each other, the control section 210 may separately control update timing of the TCI state in the plurality of cells.

The offset may be separately configured for each of the cells, for each of recognition or no recognition of the TCI state after update in the plurality of cells, or for each channel type.

(Hardware Structure)

Note that the block diagrams that have been used to describe the above embodiments show blocks in functional units. These functional blocks (components) may be implemented in arbitrary combinations of at least one of hardware and software. Also, the method for implementing each functional block is not particularly limited. That is, each functional block may be realized by one piece of apparatus that is physically or logically coupled, or may be realized by directly or indirectly connecting two or more physically or logically separate pieces of apparatus (for example, via wire, wireless, or the like) and using these plurality of pieces of apparatus. The functional blocks may be implemented by combining softwares into the apparatus described above or the plurality of apparatuses described above.

Here, functions include judgment, determination, decision, calculation, computation, processing, derivation, investigation, search, confirmation, reception, transmission, output, access, resolution, selection, designation, establishment, comparison, assumption, expectation, considering, broadcasting, notifying, communicating, forwarding, configuring, reconfiguring, allocating (mapping), assigning, and the like, but function are by no means limited to these. For example, functional block (components) to implement a function of transmission may be referred to as a "transmitting section (transmitting unit)," a "transmitter," and the like. The method for implementing each component is not particularly limited as described above.

Figure 9:
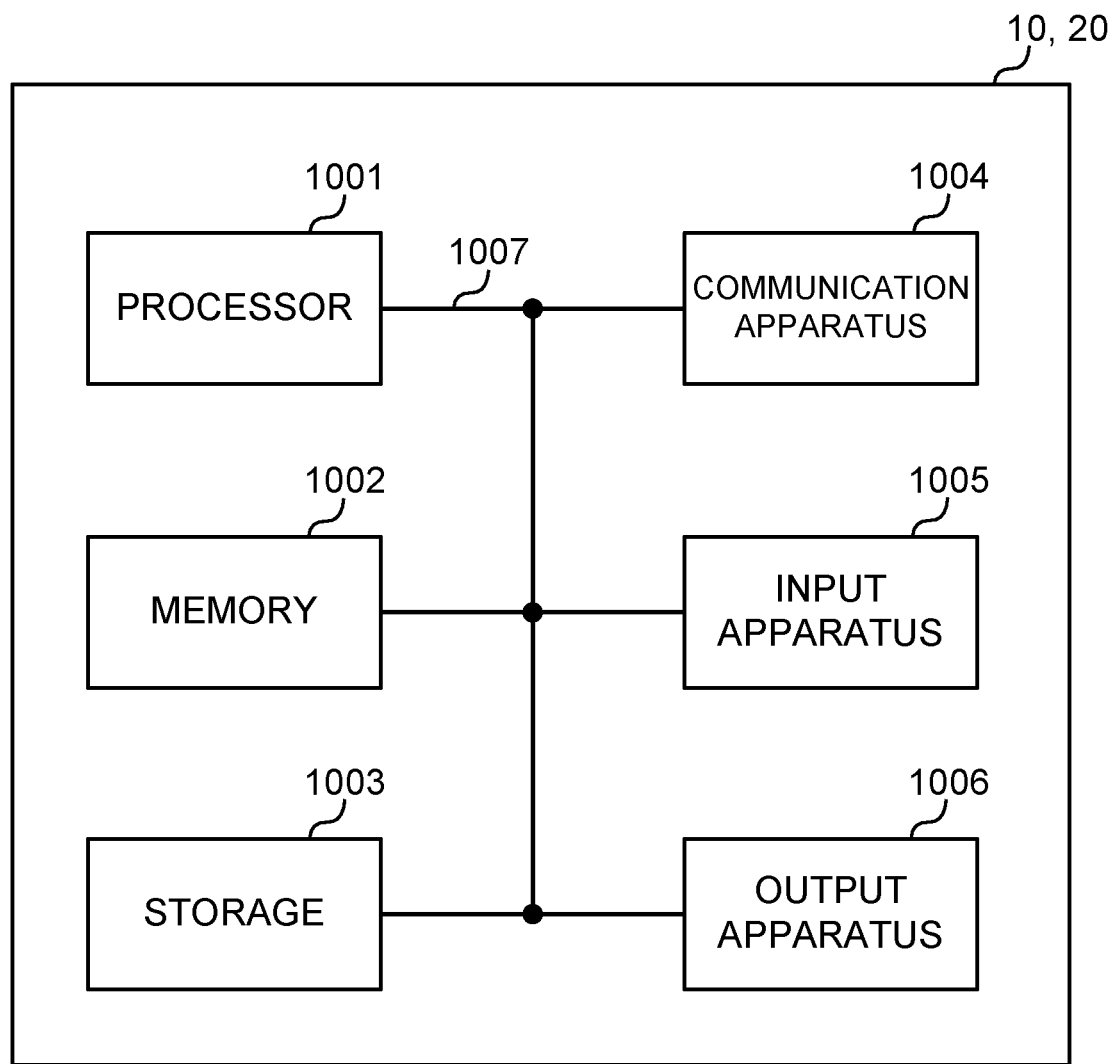
FIG. 9 is a diagram to show an example of a hardware structure of the base station and the user terminal according to one embodiment.

For example, a base station, a user terminal, and so on according to one embodiment of the present disclosure may function as a computer that executes the processes of the radio communication method of the present disclosure. FIG. 9 is a diagram to show an example of a hardware structure of the base station and the user terminal according to one embodiment. Physically, the above-described base station 10 and user terminal 20 may each be formed as a computer apparatus that includes a processor 1001, a memory 1002, a storage 1003, a communication apparatus 1004, an input apparatus 1005, an output apparatus 1006, a bus 1007, and so on.

Note that in the present disclosure, the words such as an apparatus, a circuit, a device, a section, a unit, and so on can be interchangeably interpreted. The hardware structure of the base station 10 and the user terminal 20 may be configured to include one or more of apparatuses shown in the drawings, or may be configured not to include part of apparatuses.

For example, although only one processor 1001 is shown, a plurality of processors may be provided. Furthermore, processes may be implemented with one processor or may be implemented at the same time, in sequence, or in different manners with two or more processors. Note that the processor 1001 may be implemented with one or more chips.

Each function of the base station 10 and the user terminals 20 is implemented, for example, by allowing certain software (programs) to be read on hardware such as the processor 1001 and the memory 1002, and by allowing the processor 1001 to perform calculations to control communication via the communication apparatus 1004 and control at least one of reading and writing of data in the memory 1002 and the storage 1003.

The processor 1001 controls the whole computer by, for example, running an operating system. The processor 1001 may be configured with a central processing unit (CPU), which includes interfaces with peripheral apparatus, control apparatus, computing apparatus, a register, and so on. For example, at least part of the above-described control section 110 (210), the transmitting/receiving section 120 (220), and so on may be implemented by the processor 1001.

Furthermore, the processor 1001 reads programs (program codes), software modules, data, and so on from at least one of the storage 1003 and the communication apparatus 1004, into the memory 1002, and executes various processes according to these. As for the programs, programs to allow computers to execute at least part of the operations of the above-described embodiments are used. For example, the control section 110 (210) may be implemented by control programs that are stored in the memory 1002 and that operate on the processor 1001, and other functional blocks may be implemented likewise.

The memory 1002 is a computer-readable recording medium, and may be constituted with, for example, at least one of a Read Only Memory (ROM), an Erasable Programmable ROM (EPROM), an Electrically EPROM (EEPROM), a Random Access Memory (RAM), and other appropriate storage media. The memory 1002 may be referred to as a "register," a "cache," a "main memory (primary storage apparatus)" and so on. The memory 1002 can store executable programs (program codes), software modules, and the like for implementing the radio communication method according to one embodiment of the present disclosure.

The storage 1003 is a computer-readable recording medium, and may be constituted with, for example, at least one of a flexible disk, a floppy (registered trademark) disk, a magneto-optical disk (for example, a compact disc (Compact Disc ROM (CD-ROM) and so on), a digital versatile disc, a Blu-ray (registered trademark) disk), a removable disk, a hard disk drive, a smart card, a flash memory device (for example, a card, a stick, and a key drive), a magnetic stripe, a database, a server, and other appropriate storage media. The storage 1003 may be referred to as "secondary storage apparatus."

The communication apparatus 1004 is hardware (transmitting/receiving device) for allowing inter-computer communication via at least one of wired and wireless networks, and may be referred to as, for example, a "network device," a "network controller," a "network card," a "communication module," and so on. The communication apparatus 1004 may be configured to include a high frequency switch, a duplexer, a filter, a frequency synthesizer, and so on in order to realize, for example, at least one of frequency division duplex (FDD) and time division duplex (TDD). For example, the above-described transmitting/receiving section 120 (220), the transmitting/receiving antennas 130 (230), and so on may be implemented by the communication apparatus 1004. In the transmitting/receiving section 120 (220), the transmitting section 120a (220a) and the receiving section 120b (220b) can be implemented while being separated physically or logically.

The input apparatus 1005 is an input device that receives input from the outside (for example, a keyboard, a mouse, a microphone, a switch, a button, a sensor, and so on). The output apparatus 1006 is an output device that allows sending output to the outside (for example, a display, a speaker, a Light Emitting Diode (LED) lamp, and so on). Note that the input apparatus 1005 and the output apparatus 1006 may be provided in an integrated structure (for example, a touch panel).

Furthermore, these types of apparatus, including the processor 1001, the memory 1002, and others, are connected by a bus 1007 for communicating information. The bus 1007 may be formed with a single bus, or may be formed with buses that vary between pieces of apparatus.

Also, the base station 10 and the user terminals 20 may be structured to include hardware such as a microprocessor, a digital signal processor (DSP), an Application Specific Integrated Circuit (ASIC), a Programmable Logic Device (PLD), a Field Programmable Gate Array (FPGA), and so on, and part or all of the functional blocks may be implemented by the hardware. For example, the processor 1001 may be implemented with at least one of these pieces of hardware.

(Variations)

Note that the terminology described in the present disclosure and the terminology that is needed to understand the present disclosure may be replaced by other terms that convey the same or similar meanings. For example, a "channel," a "symbol," and a "signal" (or signaling) may be interchangeably interpreted. Also, "signals" may be "messages." A reference signal may be abbreviated as an "RS," and may be referred to as a "pilot," a "pilot signal," and so on, depending on which standard applies. Furthermore, a "component carrier (CC)" may be referred to as a "cell," a "frequency carrier," a "carrier frequency" and so on.

A radio frame may be constituted of one or a plurality of periods (frames) in the time domain. Each of one or a plurality of periods (frames) constituting a radio frame may be referred to as a "subframe." Furthermore, a subframe may be constituted of one or a plurality of slots in the time domain. A subframe may be a fixed time length (for example, 1 ms) independent of numerology.

Here, numerology may be a communication parameter applied to at least one of transmission and reception of a certain signal or channel. For example, numerology may indicate at least one of a subcarrier spacing (SCS), a bandwidth, a symbol length, a cyclic prefix length, a transmission time interval (TTI), the number of symbols per TTI, a radio frame structure, a particular filter processing performed by a transceiver in the frequency domain, a particular windowing processing performed by a transceiver in the time domain, and so on.

A slot may be constituted of one or a plurality of symbols in the time domain (Orthogonal Frequency Division Multiplexing (OFDM) symbols, Single Carrier Frequency Division Multiple Access (SC-FDMA) symbols, and so on). Furthermore, a slot may be a time unit based on numerology.

A slot may include a plurality of mini-slots. Each mini-slot may be constituted of one or a plurality of symbols in the time domain. A mini-slot may be referred to as a "sub-slot." A mini-slot may be constituted of symbols less than the number of slots. A PDSCH (or PUSCH) transmitted in a time unit larger than a mini-slot may be referred to as "PDSCH (PUSCH) mapping type A." A PDSCH (or PUSCH) transmitted using a mini-slot may be referred to as "PDSCH (PUSCH) mapping type B."

A radio frame, a subframe, a slot, a mini-slot, and a symbol all express time units in signal communication. A radio frame, a subframe, a slot, a mini-slot, and a symbol may each be called by other applicable terms. Note that time units such as a frame, a subframe, a slot, mini-slot, and a symbol in the present disclosure may be interchangeably interpreted.

For example, one subframe may be referred to as a "TTI," a plurality of consecutive subframes may be referred to as a "TTI," or one slot or one mini-slot may be referred to as a "TTI." That is, at least one of a subframe and a TTI may be a subframe (1 ms) in existing LTE, may be a shorter period than 1 ms (for example, 1 to 13 symbols), or may be a longer period than 1 ms. Note that a unit expressing TTI may be referred to as a "slot," a "mini-slot," and so on instead of a "subframe."

Here, a TTI refers to the minimum time unit of scheduling in radio communication, for example. For example, in LTE systems, a base station schedules the allocation of radio resources (such as a frequency bandwidth and transmit power that are available for each user terminal) for the user terminal in TTI units. Note that the definition of TTIs is not limited to this.

TTIs may be transmission time units for channel-encoded data packets (transport blocks), code blocks, or codewords, or may be the unit of processing in scheduling, link adaptation, and so on. Note that, when TTIs are given, the time interval (for example, the number of symbols) to which transport blocks, code blocks, codewords, or the like are actually mapped may be shorter than the TTIs.

Note that, in the case where one slot or one mini-slot is referred to as a TTI, one or more TTIs (that is, one or more slots or one or more mini-slots) may be the minimum time unit of scheduling. Furthermore, the number of slots (the number of mini-slots) constituting the minimum time unit of the scheduling may be controlled.

A TTI having a time length of 1 ms may be referred to as a "normal TTI" (TTI in 3GPP Rel. 8 to Rel. 12), a "long TTI," a "normal subframe," a "long subframe," a "slot" and so on. A TTI that is shorter than a normal TTI may be referred to as a "shortened TTI," a "short TTI," a "partial or fractional TTI," a "shortened subframe," a "short subframe," a "mini-slot," a "sub-slot," a "slot" and so on.

Note that a long TTI (for example, a normal TTI, a subframe, and so on) may be interpreted as a TTI having a time length exceeding 1 ms, and a short TTI (for example, a shortened TTI and so on) may be interpreted as a TTI having a TTI length shorter than the TTI length of a long TTI and equal to or longer than 1 MS.

A resource block (RB) is the unit of resource allocation in the time domain and the frequency domain, and may include one or a plurality of consecutive subcarriers in the frequency domain. The number of subcarriers included in an RB may be the same regardless of numerology, and, for example, may be 12. The number of subcarriers included in an RB may be determined based on numerology.

Also, an RB may include one or a plurality of symbols in the time domain, and may be one slot, one mini-slot, one subframe, or one TTI in length. One TTI, one subframe, and so on each may be constituted of one or a plurality of resource blocks.

Note that one or a plurality of RBs may be referred to as a "physical resource block (Physical RB (PRB))," a "sub-carrier group (SCG)," a "resource element group (REG)," a "PRB pair," an "RB pair" and so on.

Furthermore, a resource block may be constituted of one or a plurality of resource elements (REs). For example, one RE may correspond to a radio resource field of one subcarrier and one symbol.

A bandwidth part (BWP) (which may be referred to as a "fractional bandwidth," and so on) may represent a subset of contiguous common resource blocks (common RBs) for certain numerology in a certain carrier. Here, a common RB may be specified by an index of the RB based on the common reference point of the carrier. A PRB may be defined by a certain BWP and may be numbered in the BWP.

The BWP may include a UL BWP (BWP for the UL) and a DL BWP (BWP for the DL). One or a plurality of BWPs may be configured in one carrier for a UE.

At least one of configured BWPs may be active, and a UE does not need to assume to transmit/receive a certain signal/channel outside active BWPs. Note that a "cell," a "carrier," and so on in the present disclosure may be interpreted as a "BWP".

Note that the above-described structures of radio frames, subframes, slots, mini-slots, symbols, and so on are merely examples. For example, structures such as the number of subframes included in a radio frame, the number of slots per subframe or radio frame, the number of mini-slots included in a slot, the numbers of symbols and RBs included in a slot or a mini-slot, the number of subcarriers included in an RB, the number of symbols in a TTI, the symbol length, the cyclic prefix (CP) length, and so on can be variously changed.

Also, the information, parameters, and so on described in the present disclosure may be represented in absolute values or in relative values with respect to certain values, or may be represented in another corresponding information. For example, radio resources may be specified by certain indices.

The names used for parameters and so on in the present disclosure are in no respect limiting. Furthermore, mathematical expressions that use these parameters, and so on may be different from those expressly disclosed in the present disclosure. For example, since various channels (PUCCH, PDCCH, and so on) and information elements can be identified by any suitable names, the various names allocated to these various channels and information elements are in no respect limiting.

The information, signals, and so on described in the present disclosure may be represented by using any of a variety of different technologies. For example, data, instructions, commands, information, signals, bits, symbols, chips, and so on, all of which may be referenced throughout the herein-contained description, may be represented by voltages, currents, electromagnetic waves, magnetic fields or particles, optical fields or photons, or any combination of these.

Also, information, signals, and so on can be output in at least one of from higher layers to lower layers and from lower layers to higher layers. Information, signals, and so on may be input and/or output via a plurality of network nodes.

The information, signals, and so on that are input and/or output may be stored in a specific location (for example, a memory) or may be managed by using a management table. The information, signals, and so on to be input and/or output can be overwritten, updated, or appended. The information, signals, and so on that are output may be deleted. The information, signals, and so on that are input may be transmitted to another apparatus.

Reporting of information is by no means limited to the aspects/embodiments described in the present disclosure, and other methods may be used as well. For example, reporting of information in the present disclosure may be implemented by using physical layer signaling (for example, downlink control information (DCI), uplink control information (UCI), higher layer signaling (for example, Radio Resource Control (RRC) signaling, broadcast information (master information block (MIB), system information blocks (SIBs), and so on), Medium Access Control (MAC) signaling and so on), and other signals or combinations of these.

Note that physical layer signaling may be referred to as "Layer 1/Layer 2 (L1/L2) control information (L1/L2 control signals)," "L1 control information (L1 control signal)," and so on. Also, RRC signaling may be referred to as an "RRC message," and can be, for example, an RRC connection setup message, an RRC connection reconfiguration message, and so on. Also, MAC signaling may be reported using, for example, MAC control elements (MAC CEs).

Also, reporting of certain information (for example, reporting of "X holds") does not necessarily have to be reported explicitly, and can be reported implicitly (by, for example, not reporting this certain information or reporting another piece of information).

Determinations may be made in values represented by one bit (0 or 1), may be made in Boolean values that represent true or false, or may be made by comparing numerical values (for example, comparison against a certain value).

Software, whether referred to as "software," "firmware," "middleware," "microcode," or "hardware description language," or called by other terms, should be interpreted broadly to mean instructions, instruction sets, code, code segments, program codes, programs, subprograms, software modules, applications, software applications, software packages, routines, subroutines, objects, executable files, execution threads, procedures, functions, and so on.

Also, software, commands, information, and so on may be transmitted and received via communication media. For example, when software is transmitted from a website, a server, or other remote sources by using at least one of wired technologies (coaxial cables, optical fiber cables, twisted-pair cables, digital subscriber lines (DSL), and so on) and wireless technologies (infrared radiation, microwaves, and so on), at least one of these wired technologies and wireless technologies are also included in the definition of communication media.

The terms "system" and "network" used in the present disclosure can be used interchangeably. The "network" may mean an apparatus (for example, a base station) included in the network.

In the present disclosure, the terms such as "precoding," a "precoder," a "weight (precoding weight)," "quasi-co-location (QCL)," a "Transmission Configuration Indication state (TCI state)," a "spatial relation," a "spatial domain filter," a "transmit power," "phase rotation," an "antenna port," an "antenna port group," a "layer," "the number of layers," a "rank," a "resource," a "resource set," a "resource group," a "beam," a "beam width," a "beam angular degree," an "antenna," an "antenna element," a "panel," and so on can be used interchangeably.

In the present disclosure, the terms such as a "base station (BS)," a "radio base station," a "fixed station," a "NodeB," an "eNB (eNodeB)," a "gNB (gNodeB)," an "access point," a "transmission point (TP)," a "reception point (RP)," a "transmission/reception point (TRP)," a "panel," a "cell," a "sector," a "cell group," a "carrier," a "component carrier," and so on can be used interchangeably. The base station may be referred to as the terms such as a "macro cell," a small cell," a "femto cell," a "pico cell," and so on.

A base station can accommodate one or a plurality of (for example, three) cells. When a base station accommodates a plurality of cells, the entire coverage area of the base station can be partitioned into multiple smaller areas, and each smaller area can provide communication services through base station subsystems (for example, indoor small base stations (Remote Radio Heads (RRHs))). The term "cell" or "sector" refers to part of or the entire coverage area of at least one of a base station and a base station subsystem that provides communication services within this coverage.

In the present disclosure, the terms "mobile station (MS)," "user terminal," "user equipment (UE)," and "terminal" may be used interchangeably.

A mobile station may be referred to as a "subscriber station," "mobile unit," "subscriber unit," "wireless unit," "remote unit," "mobile device," "wireless device," "wireless communication device," "remote device," "mobile subscriber station," "access terminal," "mobile terminal," "wireless terminal," "remote terminal," "handset," "user agent," "mobile client," "client," or some other appropriate terms in some cases.

At least one of a base station and a mobile station may be referred to as a "transmitting apparatus," a "receiving apparatus," a "radio communication apparatus," and so on. Note that at least one of a base station and a mobile station may be device mounted on a mobile body or a mobile body itself, and so on. The mobile body may be a vehicle (for example, a car, an airplane, and the like), may be a mobile body which moves unmanned (for example, a drone, an automatic operation car, and the like), or may be a robot (a manned type or unmanned type). Note that at least one of a base station and a mobile station also includes an apparatus which does not necessarily move during communication operation. For example, at least one of a base station and a mobile station may be an Internet of Things (IoT) device such as a sensor, and the like.

Furthermore, the base station in the present disclosure may be interpreted as a user terminal. For example, each aspect/embodiment of the present disclosure may be applied to the structure that replaces a communication between a base station and a user terminal with a communication between a plurality of user terminals (for example, which may be referred to as "Device-to-Device (D2D)," "Vehicle-to-Everything (V2X)," and the like). In this case, user terminals 20 may have the functions of the base stations 10 described above. The words "uplink" and "downlink" may be interpreted as the words corresponding to the terminal-to-terminal communication (for example, "side"). For example, an uplink channel, a downlink channel and so on may be interpreted as a side channel.

Likewise, the user terminal in the present disclosure may be interpreted as base station. In this case, the base station 10 may have the functions of the user terminal 20 described above.

Actions which have been described in the present disclosure to be performed by a base station may, in some cases, be performed by upper nodes. In a network including one or a plurality of network nodes with base stations, it is clear that various operations that are performed to communicate with terminals can be performed by base stations, one or more network nodes (for example, Mobility Management Entities (MMEs), Serving-Gateways (S-GWs), and so on may be possible, but these are not limiting) other than base stations, or combinations of these.

The aspects/embodiments illustrated in the present disclosure may be used individually or in combinations, which may be switched depending on the mode of implementation. The order of processes, sequences, flowcharts, and so on that have been used to describe the aspects/embodiments in the present disclosure may be re-ordered as long as inconsistencies do not arise. For example, although various methods have been illustrated in the present disclosure with various components of steps in exemplary orders, the specific orders that are illustrated herein are by no means limiting.

The aspects/embodiments illustrated in the present disclosure may be applied to Long Term Evolution (LTE), LTE-Advanced (LTE-A), LTE-Beyond (LTE-B), SUPER 3G, IMT-Advanced, 4th generation mobile communication system (4G), 5th generation mobile communication system (5G), Future Radio Access (FRA), New-Radio Access Technology (RAT), New Radio (NR), New radio access (NX), Future generation radio access (FX), Global System for Mobile communications (GSM (registered trademark)), CDMA 2000, Ultra Mobile Broadband (UMB), IEEE 802.11 (Wi-Fi (registered trademark)), IEEE 802.16 (WiMAX (registered trademark)), IEEE 802.20, Ultra-WideBand (UWB), Bluetooth (registered trademark), systems that use other adequate radio communication methods and next-generation systems that are enhanced based on these. A plurality of systems may be combined (for example, a combination of LTE or LTE-A and 5G, and the like) and applied.

The phrase "based on" (or "on the basis of") as used in the present disclosure does not mean "based only on" (or "only on the basis of"), unless otherwise specified. In other words, the phrase "based on" (or "on the basis of") means both "based only on" and "based at least on" ("only on the basis of" and "at least on the basis of").

Reference to elements with designations such as "first," "second," and so on as used in the present disclosure does not generally limit the quantity or order of these elements. These designations may be used in the present disclosure only for convenience, as a method for distinguishing between two or more elements. Thus, reference to the first and second elements does not imply that only two elements may be employed, or that the first element must precede the second element in some way.

The term "judging (determining)" as in the present disclosure herein may encompass a wide variety of actions. For example, "judging (determining)" may be interpreted to mean making "judgments (determinations)" about judging, calculating, computing, processing, deriving, investigating, looking up, search and inquiry (for example, searching a table, a database, or some other data structures), ascertaining, and so on.

Furthermore, "judging (determining)" may be interpreted to mean making "judgments (determinations)" about receiving (for example, receiving information), transmitting (for example, transmitting information), input, output, accessing (for example, accessing data in a memory), and so on.

In addition, "judging (determining)" as used herein may be interpreted to mean making "judgments (determinations)" about resolving, selecting, choosing, establishing, comparing, and so on. In other words, "judging (determining)" may be interpreted to mean making "judgments (determinations)" about some action.

In addition, "judging (determining)" may be interpreted as "assuming," "expecting," "considering," and the like.

The terms "connected" and "coupled," or any variation of these terms as used in the present disclosure mean all direct or indirect connections or coupling between two or more elements, and may include the presence of one or more intermediate elements between two elements that are "connected" or "coupled" to each other. The coupling or connection between the elements may be physical, logical, or a combination thereof. For example, "connection" may be interpreted as "access."

In the present disclosure, when two elements are connected, the two elements may be considered "connected" or "coupled" to each other by using one or more electrical wires, cables and printed electrical connections, and, as some non-limiting and non-inclusive examples, by using electromagnetic energy having wavelengths in radio frequency regions, microwave regions, (both visible and invisible) optical regions, or the like.

In the present disclosure, the phrase "A and B are different" may mean that "A and B are different from each other." Note that the phrase may mean that "A and B is each different from C." The terms "separate," "be coupled," and so on may be interpreted similarly to "different."

When terms such as "include," "including," and variations of these are used in the present disclosure, these terms are intended to be inclusive, in a manner similar to the way the term "comprising" is used. Furthermore, the term "or" as used in the present disclosure is intended to be not an exclusive disjunction.

For example, in the present disclosure, when an article such as "a," "an," and "the" in the English language is added by translation, the present disclosure may include that a noun after these articles is in a plural form.

Now, although the invention according to the present disclosure has been described in detail above, it should be obvious to a person skilled in the art that the invention according to the present disclosure is by no means limited to the embodiments described in the present disclosure. The invention according to the present disclosure can be implemented with various corrections and in various modifications, without departing from the spirit and scope of the invention defined by the recitations of claims. Consequently, the description of the present disclosure is provided only for the purpose of explaining examples, and should by no means be construed to limit the invention according to the present disclosure in any way.

What is claimed is:

1. A terminal comprising:
   a receiver that receives a first information regarding switching of a transmission configuration indication (TCI) state, and a second information regarding switching a spatial relation; and
   a processor that determines, based on whether the TCI state after switching in a plurality of cells is known or unknown and a first offset configured after transmission of a positive acknowledgment (ACK) for the first information, a timing for switching the TCI state in the plurality of cells, and determines, based on whether the spatial relation after switching in a plurality of cells is known or unknown and a second offset configured after transmission of a positive acknowledgment (ACK) for the second information, a timing for switching the spatial relation in the plurality of cells,
   wherein the timing for switching the TCI state and the spatial relation in the plurality of cells is controlled separately for each cell, and
   when the spatial relation is known, the second offset configured after a positive acknowledgement (ACK) for the second information is shorter than the second offset configured after a positive acknowledgement for the second information, when the spatial relation is unknown.

2. The terminal according to claim 1, wherein the first offset configured after transmission of the positive acknowledgment (ACK) for the first information when the TCI state is unknown, and the second offset configured after transmission of the positive acknowledgement (ACK) for the second information when the spatial relation is unknown each includes a time for Layer 1 Reference Signal Received Power (L1-RSRP) measurement.

3. The terminal according to claim 2, wherein the first offset applied for switching the TCI state differs from the second offset applied for switching the spatial relation.

4. The terminal according to claim 1, wherein the first offset applied for switching the TCI state differs from the second offset applied for switching the spatial relation.

5. A radio communication method for a terminal, comprising:
   receiving a first information regarding switching of a transmission configuration indication (TCI) state, and a second information regarding switching a spatial relation; and
   determining, based on whether the TCI state after switching in a plurality of cells is known or unknown and a first offset configured after transmission of a positive acknowledgment (ACK) for the first information, a timing for switching the TCI state in the plurality of cells, and determining, based on whether the spatial relation after switching in a plurality of cells is known or unknown and a second offset configured after transmission of a positive acknowledgment (ACK) for the second information, a timing for switching the spatial relation in the plurality of cells,
   wherein the timing for switching the TCI state and the spatial relation in the plurality of cells is controlled separately for each cell, and
   when the spatial relation is known, the second offset configured after a positive acknowledgement (ACK) for the second information is shorter than the second offset configured after a positive acknowledgement for the second information, when the spatial relation is unknown.

6. A base station comprising:
   a transmitter that transmits a first information regarding switching of a transmission configuration indication (TCI) state, and a second information regarding switching of a spatial relation; and
   a processor that controls, based on whether the TCI state after switching in a plurality of cells is known or unknown and a first offset configured after transmission of a positive acknowledgment (ACK) for the first information, a timing for switching the TCI state in the plurality of cells, and controls, based on whether the spatial relation after switching in a plurality of cells is known or unknown and a second offset configured after transmission of a positive acknowledgment (ACK) for the second information, a timing for switching the spatial relation in the plurality of cells,
   wherein the timing for switching the TCI state and the spatial relation in the plurality of cells is controlled separately for each cell, and
   when the spatial relation is known, the second offset configured after a positive acknowledgement (ACK) for the second information is shorter than the second offset configured after a positive acknowledgement for the second information, when the spatial relation is unknown.

7. A system comprising a terminal and a base station, wherein
   the base station comprises:
      a transmitter that transmits a first information regarding switching of a transmission configuration indication (TCI) state, and a second information regarding switching of a spatial relation, and
   the terminal comprises:
      a receiver that receives the first information and the second information; and
      a processor that determines, based on whether the TCI state after switching in a plurality of cells is known or unknown and a first offset configured after transmission of a positive acknowledgment (ACK) for the first information, a timing for switching the TCI state in the plurality of cells, and determines, based on whether the spatial relation after switching in a plurality of cells is known or unknown and a second offset configured after transmission of a positive acknowledgment (ACK) for the second information, a timing for switching the spatial relation in the plurality of cells,
      wherein the timing for switching the TCI state and the spatial relation in the plurality of cells is controlled separately for each cell, and
      when the spatial relation is known, the second offset configured after a positive acknowledgement (ACK) for the second information is shorter than the second offset configured after a positive acknowledgement for the second information, when the spatial relation is unknown.

* * * * *